US012761699B2

(12) United States Patent
Mei

(10) Patent No.: US 12,761,699 B2
(45) Date of Patent: Oct. 13, 2026

(54) COMPONENT CONTROL METHOD AND RELATED APPARATUS

(71) Applicant: HUAWEI TECHNOLOGIES CO., LTD., Shenzhen (CN)

(72) Inventor: Yuan Mei, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/023,334

(22) Filed: Jan. 16, 2025

(65) Prior Publication Data

US 2025/0155934 A1 May 15, 2025

Related U.S. Application Data

(63) Continuation of application No. PCT/CN2023/108394, filed on Jul. 20, 2023.

(30) Foreign Application Priority Data

Jul. 22, 2022 (CN) ......................... 202210868752.4

(51) Int. Cl.

*G06F 1/16* (2006.01)
*G06F 1/3234* (2019.01)
*G06F 3/01* (2006.01)

(52) U.S. Cl.

CPC .......... *G06F 1/1677* (2013.01); *G06F 1/1616* (2013.01); *G06F 1/3265* (2013.01); *G06F 3/017* (2013.01)

(58) Field of Classification Search

CPC .... G06F 1/1677; G06F 1/1616; G06F 1/3265; G06F 3/017; G06F 1/1618; G06F 1/1641; G06F 1/1652; G06F 1/3206; G06F 1/3215; G06F 1/3218; G06F 1/3287;

(Continued)

(56) References Cited

U.S. PATENT DOCUMENTS 5,303,171 A * 4/1994 Belt .......................... G06F 1/24 713/321
7,620,830 B2 * 11/2009 Adams ..................... G11B 5/54 713/323
10,761,404 B2 * 9/2020 Leimer ................ G03B 11/043

(Continued)

FOREIGN PATENT DOCUMENTS

CN 204350243 U 5/2015
CN 204554314 U 8/2015

(Continued)

*Primary Examiner* — Grant Sitta

(57) ABSTRACT

An electronic device includes a foldable screen, a first sensor, a security chip, a control module, and a first functional component. The first sensor, the security chip, and the control module are directly or indirectly connected through a circuit wire. The control module is configured to control the first functional component to be disconnected from or connected to a power supply. The first sensor is configured to detect a first operation of a user. The first sensor is further configured to send first sensor data to the security chip based on the first operation, where the sensor data indicates a posture of the electronic device. The security chip is configured to send a first control instruction to the control module based on the posture indicated by the first sensor data.

14 Claims, 25 Drawing Sheets

(58) Field of Classification Search
CPC ...... G06F 21/6245; G06F 21/74; G06F 21/81; G06F 21/84; G06F 1/16
See application file for complete search history.

(56) References Cited

U.S. PATENT DOCUMENTS

| | | | | |
|---|---|---|---|---|
| 10,991,789 | B2 * | 4/2021 | Chen | G06F 3/1446 |
| 11,874,710 | B2 * | 1/2024 | Cooper | G06F 3/0482 |
| 12,126,683 | B2 * | 10/2024 | Koo | H04W 4/38 |
| 12,265,434 | B2 * | 4/2025 | Kacelenga | G06F 1/1677 |
| 2008/0178282 | A1 * | 7/2008 | Yoffe | G06F 21/70 726/17 |
| 2013/0340069 | A1 * | 12/2013 | Yoffe | G06F 21/82 726/17 |
| 2017/0185134 | A1 * | 6/2017 | Han | G06F 1/26 |
| 2017/0263254 | A1 * | 9/2017 | Dewan | G06F 3/165 |
| 2017/0289443 | A1 * | 10/2017 | Nguyen | H04N 23/65 |
| 2018/0246832 | A1 * | 8/2018 | Nevalainen | G06F 21/82 |
| 2019/0377909 | A1 * | 12/2019 | Liu | G09G 3/36 |
| 2020/0178374 | A1 * | 6/2020 | Holtman | H05B 47/10 |
| 2022/0044607 | A1 * | 2/2022 | Kim | G06F 1/1677 |
| 2022/0077275 | A1 * | 3/2022 | Jo | G09G 3/035 |
| 2023/0049857 | A1 * | 2/2023 | Park | G06F 1/1616 |
| 2023/0069789 | A1 * | 3/2023 | Koo | G06F 21/6245 |
| 2023/0336655 | A1 * | 10/2023 | Lee | H04B 5/79 |
| 2024/0028780 | A1 * | 1/2024 | Perez | G06F 21/32 |
| 2025/0217492 | A1 * | 7/2025 | Zhang | G06F 21/602 |

FOREIGN PATENT DOCUMENTS

| | | | | |
|---|---|---|---|---|
| CN | 204559728 | U | 8/2015 | |
| CN | 105872320 | A | 8/2016 | |
| CN | 106101514 | A | 11/2016 | |
| CN | 205781809 | U | 12/2016 | |
| CN | 207321460 | U | 5/2018 | |
| CN | 108401143 | A | 8/2018 | |
| CN | 108408032 | A | 8/2018 | |
| CN | 207777932 | U | 8/2018 | |
| CN | 108662382 | A | 10/2018 | |
| CN | 208028987 | U | 10/2018 | |
| CN | 208046737 | U | 11/2018 | |
| CN | 208046765 | U | 11/2018 | |
| CN | 208402019 | U | 1/2019 | |
| CN | 109379461 | A | 2/2019 | |
| CN | 208522929 | U | 2/2019 | |
| CN | 208766664 | U | 4/2019 | |
| CN | 109815676 | A | 5/2019 | |
| CN | 109922276 | A | 6/2019 | |
| CN | 208987038 | U | 6/2019 | |
| CN | 110602689 | A | 12/2019 | |
| CN | 210201916 | U | 3/2020 | |
| CN | 210640975 | U | 5/2020 | |
| CN | 211047058 | U | 7/2020 | |
| CN | 111954107 | A | 11/2020 | |
| CN | 112333352 | A | 2/2021 | |
| CN | 112565699 | A | 3/2021 | |
| CN | 212840610 | U | 3/2021 | |
| CN | 212850913 | U | 3/2021 | |
| CN | 112860359 | A | 5/2021 | |
| CN | 213869610 | U | 8/2021 | |
| CN | 214481136 | U | 10/2021 | |
| CN | 214675417 | U | 11/2021 | |
| CN | 114329496 | A | 4/2022 | |
| EP | 3958109 | A1 | 2/2022 | |
| KR | 102176046 | B1 * | 11/2020 | G06V 40/16 |
| WO | 2020155876 | A1 | 8/2020 | |

* cited by examiner

CONT. FROM FIG. 6A-1

COMPONENT CONTROL METHOD AND RELATED APPARATUS

CROSS-REFERENCE TO RELATED APPLICATIONS

This application is a continuation of International Application PCT/CN2023/108394, filed on Jul. 20, 2023, which claims priority to Chinese Patent Application 202210868752.4, filed on Jul. 22, 2022. The disclosures of the aforementioned applications are hereby incorporated by reference in their entirety.

TECHNICAL FIELD

This application relates to the field of electronic technologies, and in particular, to a component control method and a related apparatus.

BACKGROUND

An intelligent terminal (for example, a mobile phone) plays an increasingly important role in life, and privacy protection of the intelligent terminal is increasingly concerned by a user. Some third-party applications installed on the intelligent terminal may use functional components such as a microphone, a camera, and a positioning module to steal privacy information of the user. In a confidentiality-required scenario (for example, an important conference), privacy information leakage may cause great losses to the user. Currently, the intelligent terminal usually prevents, at a software layer, the third-party application from stealing user information in a background by using the functional components. For example, when the third-party application requests to obtain audio data collected by the microphone, the audio data collected by the microphone is replaced with null data at a software driver layer, and the null data is sent to the third-party application at an application framework layer.

However, the third-party application may unauthorizedly obtain a root permission of the device, and may bypass the software layer with the root permission to continue to obtain data collected by the functional components. Consequently, there is still an information leakage risk in the foregoing solution.

SUMMARY

This application provides a component control method and a related apparatus, to effectively avoid information leakage of a first functional component, ensure information security of a user, and improve user experience.

According to a first aspect, this application provides an electronic device, where the electronic device includes a foldable screen, a first sensor, a security chip, a control module, and a first functional component, the first sensor, the security chip, and the control module are directly or indirectly connected through a circuit wire, and the control module is configured to control the first functional component to be disconnected from or connected to a power supply; the first sensor is configured to detect a first operation of a user; the first sensor is further configured to send first sensor data to the security chip based on the first operation, where the first sensor data indicates a posture of the electronic device; and the security chip is configured to send a first control instruction to the control module based on the posture indicated by the first sensor data, where the first control instruction indicates to stop power supplying to the first functional component.

In this embodiment of this application, when detecting an operation of adjusting the posture of the electronic device to a preset posture by the user, the first sensor generates the first sensor data, and the first sensor data may trigger the security chip to deliver an instruction to the control module, to indicate the control module to stop power supplying to the first functional component. In this way, the user may adjust the posture of the electronic device, to control the first functional component to be powered off, so as to effectively avoid leakage of privacy information of the first functional component, ensure information security of the user, and improve user experience. In addition, the first sensor, the security chip, the control module, and the first functional component each transmit a signal through a circuit wire between hardware modules, and a third-party application cannot tamper with or forge an instruction sent by the security chip. Therefore, the third-party application cannot control, by using a software system, the first functional component to be powered off, and this prevents the third-party application from maliciously controlling the first functional component to be powered off.

In an implementation, the first sensor is further configured to detect a second operation of the user; the first sensor is further configured to send second sensor data to the security chip based on the second operation, where the second sensor data indicates a posture of the electronic device; and the security chip is further configured to send a second control instruction to the control module based on the posture indicated by the second sensor data, where the second control instruction indicates to restore power supplying to the first functional component.

In this embodiment of this application, after the first functional component is powered off, the user may adjust the posture of the electronic device to control power supplying to the first functional component to be restored, the first sensor, the security chip, the control module, and the first functional component each transmit a signal through the circuit wire between hardware modules, and the third-party application cannot tamper with or forge an instruction sent by the security chip. Therefore, after the first functional component is powered off, the third-party application cannot control, by using the software system, power supplying to the first functional component to be restored, and naturally cannot further control the first functional component to collect privacy information of the user. This ensures information security of the user.

In an implementation, the first operation includes an operation of adjusting a posture of the electronic device to a first posture, and the first sensor data is used to determine whether the electronic device is in the first posture; and the sending a first control instruction to the control module based on the posture indicated by the first sensor data includes: sending the first control instruction to the control module when it is determined, based on the first sensor data, that the electronic device is in the first posture.

In this embodiment of this application, the user may adjust the posture of the electronic device to the first posture, to control the first functional component to be powered off, so as to effectively avoid leakage of privacy information of the first functional component, ensure information security of the user, and improve user experience.

In an implementation, the second operation includes an operation of adjusting the electronic device from the first posture to a second posture, and the second sensor data is used to determine whether the electronic device is in the second posture; and the sending a second control instruction to the control module based on the posture indicated by the second sensor data includes: sending the second control instruction to the control module when it is determined, based on the second sensor data, that the electronic device is adjusted from the first posture to the second posture.

In this embodiment of this application, the user may adjust the posture of the electronic device to control the first functional component to be powered off and power supplying to the first functional component to be restored. This implements quick switching between a privacy mode and a normal service, and ensures user experience.

In an implementation, the first operation includes activating a privacy mode, and the second operation includes deactivating the privacy mode.

In this embodiment of this application, the user may activate the privacy mode through the first operation, where the activating a privacy mode includes controlling the first functional component to be powered off; and the user may further deactivate the privacy mode through the second operation, where the deactivating the privacy mode includes controlling power supplying to the first functional component to be restored. In this way, information leakage of the first functional component can be effectively avoided, information security of the user is ensured, and user experience is improved.

According to a second aspect, this application provides an electronic device, where the electronic device includes a detection component, a security chip, a control module, and a first functional component, the detection component, the security chip, and the control module are directly or indirectly connected through a circuit wire, and the control module is configured to control the first functional component to be disconnected from or connected to a power supply; the detection component is configured to detect a first operation of a user; the detection component is further configured to send a first control signal to the security chip based on the first operation, where the first control signal indicates to stop power supplying to the first functional component; and the security chip is configured to send a first control instruction to the control module based on the first control signal, where the first control instruction indicates to stop power supplying to the first functional component.

In this embodiment of this application, when the user performs the first operation by using the detection component, the detection component may obtain the first control signal, and trigger, by using the control signal, the security chip to deliver an instruction to the control module, to indicate the control module to stop power supplying to the first functional component. In this way, the user may control, by using the detection component, the first functional component to be powered off, so as to effectively avoid leakage of privacy information of the first functional component, ensure information security of the user, and improve user experience. In addition, the detection component, the security chip, the control module, and the first functional component each transmit a signal through the circuit wire between hardware modules, and a third-party application cannot tamper with or forge an instruction sent by the security chip. Therefore, the third-party application cannot control, by using a software system, the first functional component to be powered off, and this prevents the third-party application from maliciously controlling the first functional component to be powered off.

In an implementation, the detection component is further configured to detect a second operation of the user; the detection component is further configured to send a second control signal to the security chip based on the second operation, where the second control signal indicates to restore power supplying to the first functional component; and the security chip is further configured to send a second control instruction to the control module based on the second control signal, where the second control instruction indicates to restore power supplying to the first functional component.

In this embodiment of this application, after the first functional component is powered off, the user may control, by using the detection component, power supplying to the first functional component to be restored, the detection component, the security chip, the control module, and the first functional component each transmit a signal through the circuit wire between hardware modules, and the third-party application cannot tamper with or forge an instruction sent by the security chip. Therefore, after the first functional component is powered off, the third-party application cannot control, by using the software system, power supplying to the first functional component to be restored, and naturally cannot further control the first functional component to collect privacy information of the user. This ensures information security of the user. In addition, the user may control, by using the detection component, the first functional component to be powered off and power supplying to the first functional component to be restored. This implements quick switching between a privacy mode and a normal service, and ensures user experience.

In an implementation, the first operation includes an operation on the detection component, and the first control signal includes a signal generated by the detection component based on the first operation; and the second operation includes an operation on the detection component, and the second control signal includes a signal generated by the detection component based on the second operation.

In an implementation, the first operation includes activating a privacy mode, and the second operation includes deactivating the privacy mode.

In this embodiment of this application, the user may activate the privacy mode through the first operation, where the activating a privacy mode includes controlling the first functional component to be powered off; and the user may further deactivate the privacy mode through the second operation, where the deactivating the privacy mode includes controlling power supplying to the first functional component to be restored. In this way, information leakage of the first functional component can be effectively avoided, information security of the user is ensured, and user experience is improved.

In an implementation, the electronic device includes a foldable screen, and the detection component includes a hardware switch and a first sensor. The first operation includes an operation performed on the hardware switch and an operation of adjusting a posture of the electronic device to a first posture, the first control signal includes a first switch signal generated by the hardware switch based on the first operation, and first sensor data collected by the first sensor, and the first sensor data is used to determine whether the electronic device is in the first posture. The second operation includes an operation performed on the hardware switch, and/or an operation of adjusting the electronic device from the first posture to a second posture, the first control signal includes a second switch signal generated by the hardware switch based on the second operation, and/or second sensor data collected by the first sensor, and the second sensor data is used to determine whether the electronic device is in the second posture. The sending a first control signal to the security chip includes: The hardware switch sends the first switch signal to the security chip; and the first sensor sends the first sensor data to the security chip. The sending a first control instruction to the control module based on the first control signal includes: sending the first control instruction to the control module when the first switch signal is received and it is determined, based on the first sensor data, that the electronic device is in the first posture. The sending a second control signal to the security chip includes: The hardware switch sends the second switch signal to the security chip, and/or the first sensor sends the second sensor data to the security chip. The sending a second control instruction to the control module based on the second control signal includes: sending the second control instruction to the control module when the first switch signal is received, and/or it is determined, based on the second control signal, that the electronic device is adjusted from the first posture to the second posture.

During implementation of this embodiment of this application, the hardware switch and the first sensor may trigger the security chip to deliver an instruction to the control module to indicate the control module to stop/restore power supplying to the first functional component, the hardware switch, the first sensor, the security chip, the control module, and the first functional component each transmit a signal through the circuit wire, and the third-party application cannot tamper with or forge an instruction sent by the security chip. This prevents the third-party application from maliciously controlling, by using the software system, power supplying to the first functional component to be stopped/restored. In this way, information leakage of the first functional component is effectively avoided, information security of the user is ensured, and user experience is improved.

According to a third aspect, this application provides a component control method, applied to an electronic device, where the electronic device includes a foldable screen, a first sensor, a security chip, a control module, and a first functional component, the first sensor, the security chip, and the control module are directly or indirectly connected through a circuit wire, and the control module is configured to control the first functional component to be disconnected from or connected to a power supply; and the method includes: The first sensor detects a first operation of a user; the first sensor sends first sensor data to the security chip based on the first operation, where the first sensor data indicates a posture of the electronic device; and the security chip sends a first control instruction to the control module based on the posture indicated by the first sensor data, where the first control instruction indicates to stop power supplying to the first functional component.

In an implementation, the method further includes: The first sensor detects a second operation of the user; the first sensor sends second sensor data to the security chip based on the second operation, where the second sensor data indicates a posture of the electronic device; and the security chip sends a second control instruction to the control module based on the posture indicated by the second sensor data, where the second control instruction indicates to restore power supplying to the first functional component.

In an implementation, the first operation includes an operation of adjusting a posture of the electronic device to a first posture, and the first sensor data is used to determine whether the electronic device is in the first posture; and the sending a first control instruction to the control module based on the posture indicated by the first sensor data includes: sending the first control instruction to the control module when it is determined, based on the first sensor data, that the electronic device is in the first posture.

In an implementation, the second operation includes an operation of adjusting the electronic device from the first posture to a second posture, and the second sensor data is used to determine whether the electronic device is in the second posture; and the sending a second control instruction to the control module based on the posture indicated by the second sensor data includes: sending the second control instruction to the control module when it is determined, based on the second sensor data, that the electronic device is adjusted from the first posture to the second posture.

In an implementation, the first operation includes activating a privacy mode, and the second operation includes deactivating the privacy mode.

According to a fourth aspect, this application provides a component control method, applied to an electronic device, where the electronic device includes a detection component, a security chip, a control module, and a first functional component, the detection component, the security chip, and the control module are directly or indirectly connected through a circuit wire, and the control module is configured to control the first functional component to be disconnected from or connected to a power supply; and the method includes: The detection component detects a first operation of a user; the detection component sends a first control signal to the security chip based on the first operation, where the first control signal indicates to stop power supplying to the first functional component; and the security chip sends a first control instruction to the control module based on the first control signal, where the first control instruction indicates to stop power supplying to the first functional component.

In an implementation, the method further includes: the detection component detects a second operation of the user; the detection component sends a second control signal to the security chip based on the second operation, where the second control signal indicates to restore power supplying to the first functional component; and the security chip sends a second control instruction to the control module based on the second control signal, where the second control instruction indicates to restore power supplying to the first functional component.

In an implementation, the first operation includes an operation on the detection component, and the first control signal includes a signal generated by the detection component based on the first operation; and the second operation includes an operation on the detection component, and the second control signal includes a signal generated by the detection component based on the second operation.

In an implementation, the first operation includes activating a privacy mode, and the second operation includes deactivating the privacy mode.

In an implementation, the electronic device includes a foldable screen, and the detection component includes a hardware switch and a first sensor. The first operation includes an operation performed on the hardware switch and an operation of adjusting a posture of the electronic device to a first posture, the first control signal includes a first switch signal generated by the hardware switch based on the first operation, and first sensor data collected by the first sensor, and the first sensor data is used to determine whether the electronic device is in the first posture. The second operation includes an operation performed on the hardware switch, and/or an operation of adjusting the electronic device from the first posture to a second posture, the first control signal includes a second switch signal generated by the hardware switch based on the second operation, and/or second sensor data collected by the first sensor, and the second sensor data is used to determine whether the electronic device is in the second posture. The sending a first control signal to the security chip includes: The hardware switch sends the first switch signal to the security chip; and the first sensor sends the first sensor data to the security chip. The sending a first control instruction to the control module based on the first control signal includes: sending the first control instruction to the control module when the first switch signal is received and it is determined, based on the first sensor data, that the electronic device is in the first posture. The sending a second control signal to the security chip includes: The hardware switch sends the second switch signal to the security chip, and/or the first sensor sends the second sensor data to the security chip. The sending a second control instruction to the control module based on the second control signal includes: sending the second control instruction to the control module when the first switch signal is received, and/or it is determined, based on the second control signal, that the electronic device is adjusted from the first posture to the second posture.

According to a fifth aspect, an embodiment of this application provides a computer storage medium, including computer instructions. When the computer instructions are run on an electronic device, the electronic device is enabled to perform the component control method according to any one of the possible implementations of the third aspect and the fourth aspect.

According to a sixth aspect, an embodiment of this application provides a computer program product. When the computer program product runs on a computer, the computer is enabled to perform the component control method according to any one of the possible implementations of the third aspect and the fourth aspect.

DESCRIPTION OF EMBODIMENTS

Figure 1A:
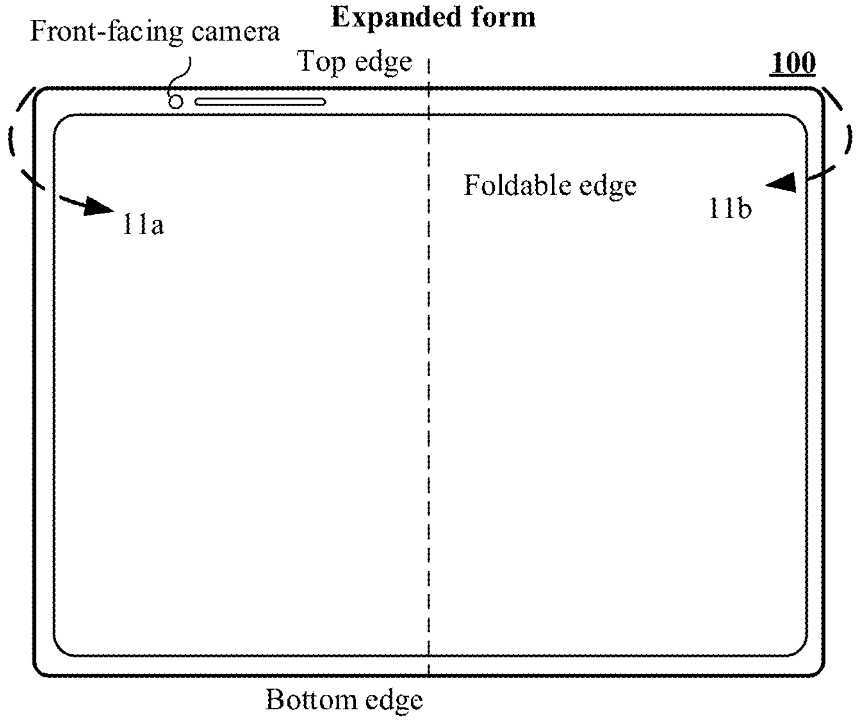
FIG. 1A to FIG. 1F are diagrams of forms of an electronic device configured with a foldable screen according to an embodiment of this application.
Figure 1B:
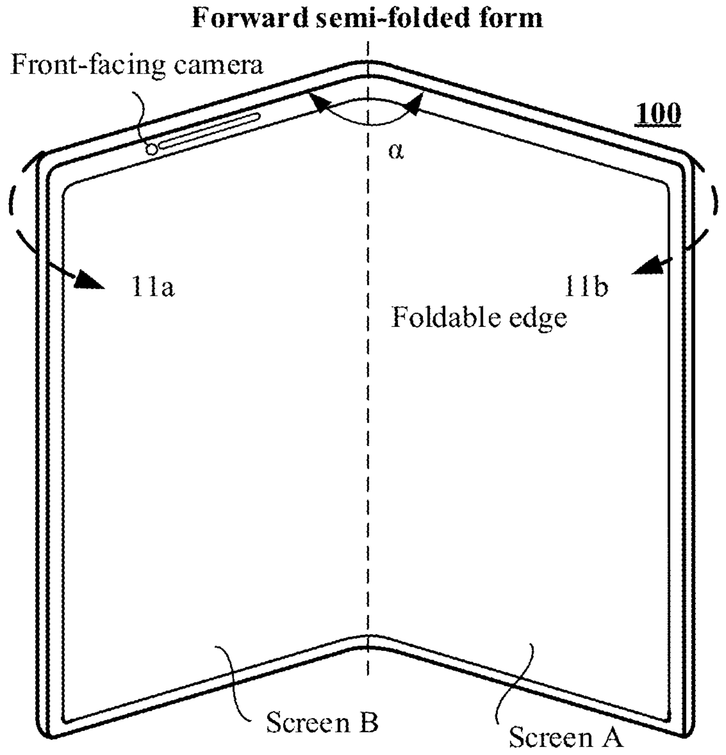
Figure 1C:
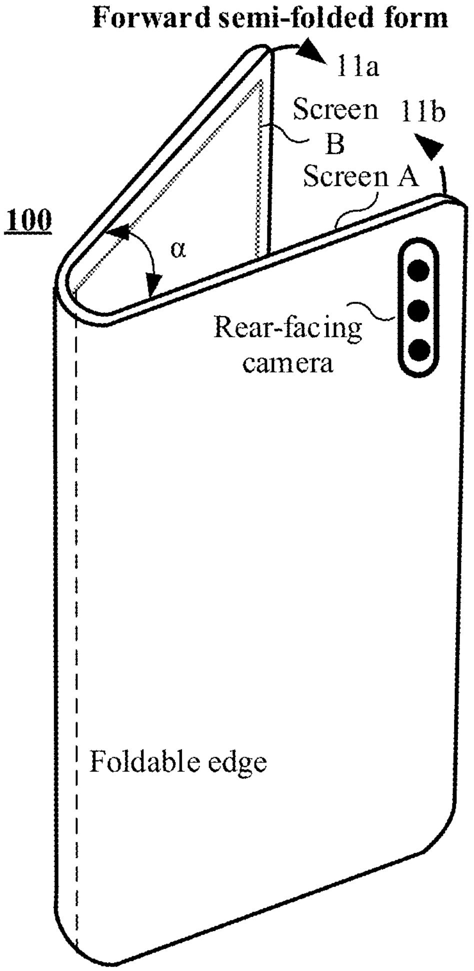

Technical solutions according to embodiments of this application are clearly and completely described in the following with reference to accompanying drawings. In descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (XML). Interface source code is parsed and rendered on an electronic device, and is finally presented as content that can be identified by the user. A common representation form of the user interface is a graphical user interface (GUI), which refers to a user interface that is displayed in a graphical manner and that is related to a computer operation. The user interface may be a visual interface element like a text, an icon, a button, a menu, a tab, a text box, a dialog box, a status bar, a navigation bar, or a Widget that is displayed on a display of the electronic device.

Embodiments of this application provide a component control method. The method may be applied to an electronic device 100 configured with a non-foldable screen, or may be applied to an electronic device 100 configured with a foldable screen. The foldable screen may be a longitudinally foldable screen or a transversely foldable screen, and the foldable screen may be folded along a foldable edge to form at least two screens, for example, a screen A and a screen B. In addition, the foldable screen may be presented in a plurality of forms based on folded degrees. In some embodiments of this application, the foldable screen of the electronic device 100 may be presented in one or more of an expanded form, a forward semi-folded form, a forward folded form, a reverse semi-folded form, and a reverse folded form.

The following describes various forms of the electronic device 100 configured with the foldable screen.

For example, FIG. 1A to FIG. 1F are diagrams of product forms of an electronic device 100 having a longitudinally foldable screen according to an embodiment of this application. A foldable edge of the longitudinally foldable screen is perpendicular to a top edge line and a bottom edge line of the electronic device 100. For ease of description, the top edge line is referred to as a top edge for short, and the bottom edge line is referred to as a bottom edge for short.

Figure 1D:
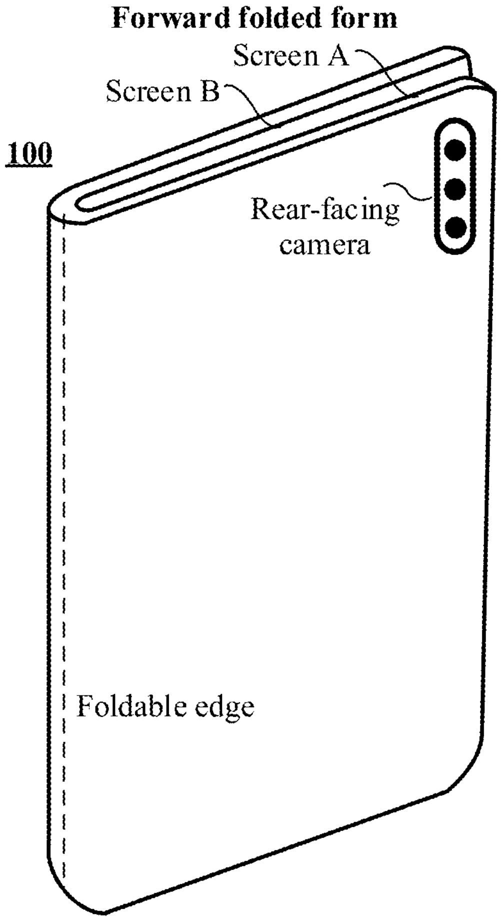

FIG. 1A is a diagram of an expanded form of the longitudinally foldable screen. The longitudinally foldable screen shown in FIG. 1A may be folded inward along the foldable edge in a direction 11*a* and/or a direction 11*b* shown in FIG. 1A, to form forward semi-folded forms shown in FIG. 1B and FIG. 1C. The longitudinally foldable screen is folded into a screen A and a screen B. The screen A and a front-facing camera on the electronic device 100 may be on a same side of the foldable edge. The longitudinally foldable screen shown in FIG. 1C may continue to be folded inward along the foldable edge in the direction 11*a* and the direction 11*b*, to form a forward folded form shown in FIG. 1D. As shown in FIG. 1D, after the longitudinally foldable screen of the electronic device 100 is completely folded inward, the screen A and the screen B are opposite to each other, and are invisible to a user.

Figure 1E:
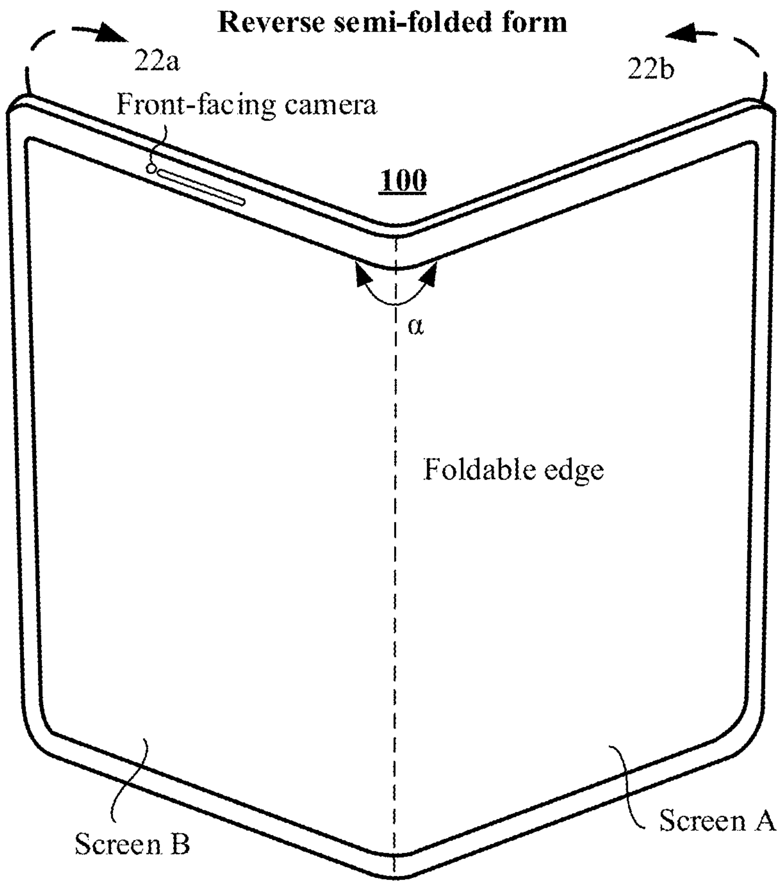
Figure 1F:
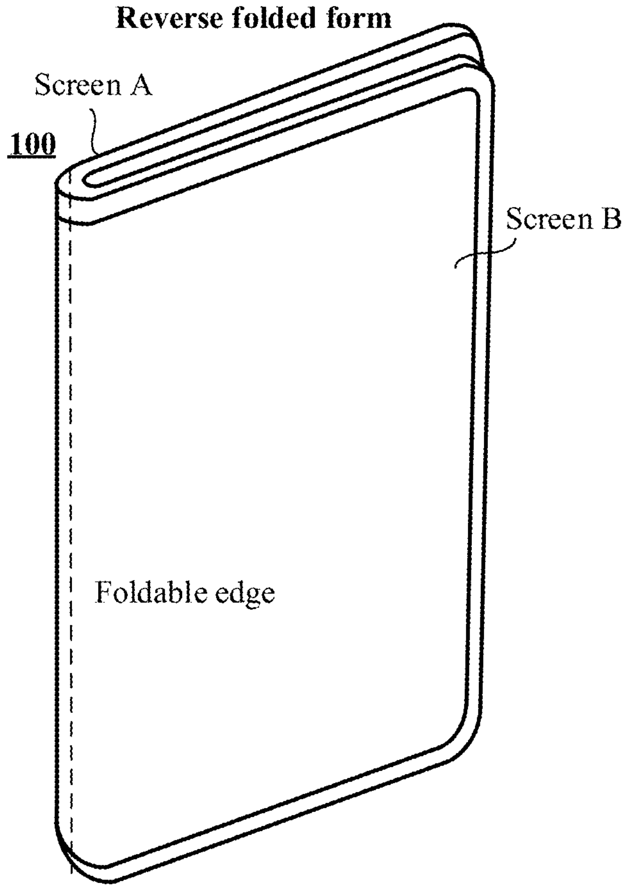

In some embodiments of this application, the longitudinally foldable screen shown in FIG. 1A may further be folded outward along the foldable edge, to form a reverse semi-folded form shown in FIG. 1E; and the longitudinally foldable screen may continue to be folded outward in a direction 22*a* and a direction 22*b* shown in FIG. 1E, to form a reverse folded form shown in FIG. 1F. As shown in FIG. 1F, after the longitudinally foldable screen of the electronic device 100 is completely folded outward, the screen A and the screen B face away from each other, the rear side of the electronic device 100 is invisible to the user, and the rear side of the electronic device 100 includes the rear side of the screen A and the rear side of the screen B.

For example, FIG. 2A to FIG. 2F are diagrams of product forms of an electronic device 100 having a transversely foldable screen according to an embodiment of this application. A foldable edge of the transversely foldable screen is parallel to the top edge and the bottom edge of the electronic device 100.

Figure 2A:
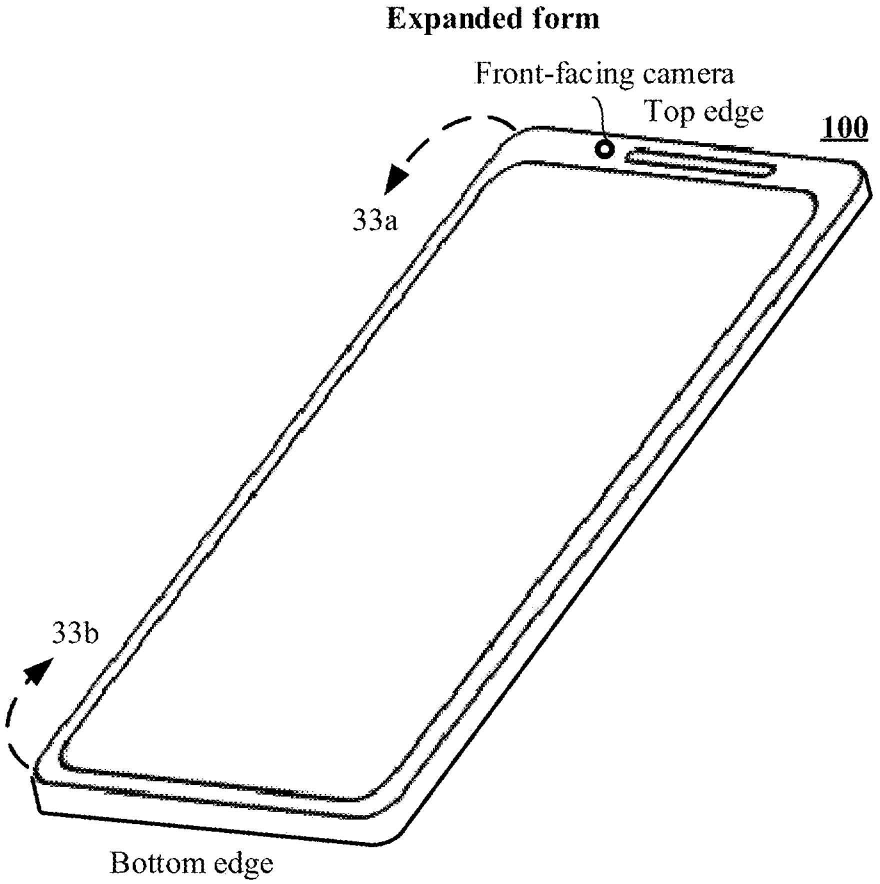
FIG. 2A to FIG. 2F are diagrams of forms of an electronic device configured with a foldable screen according to an embodiment of this application.
Figure 2B:
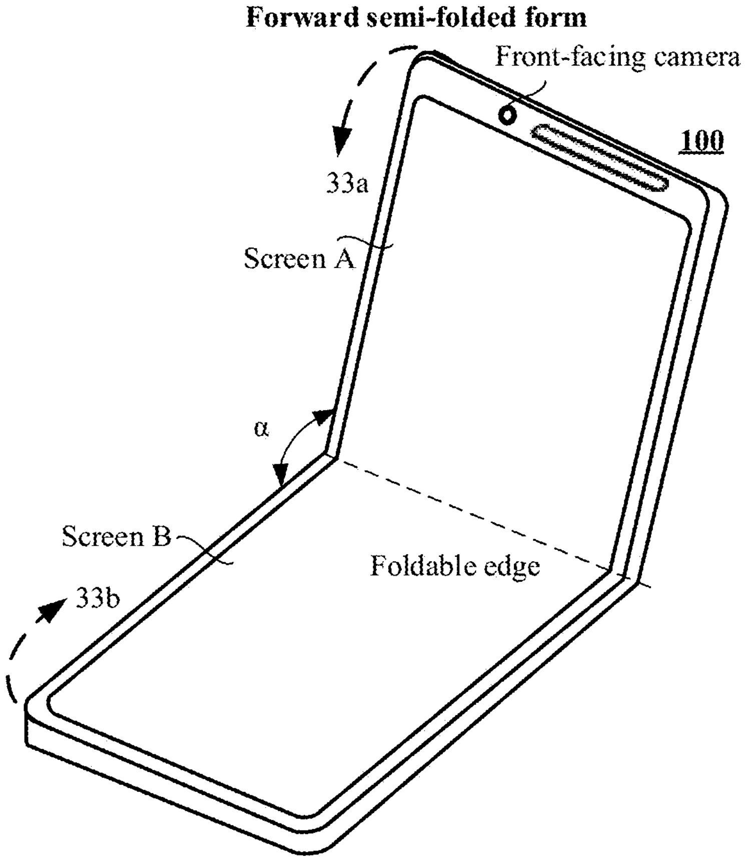
Figure 2C:
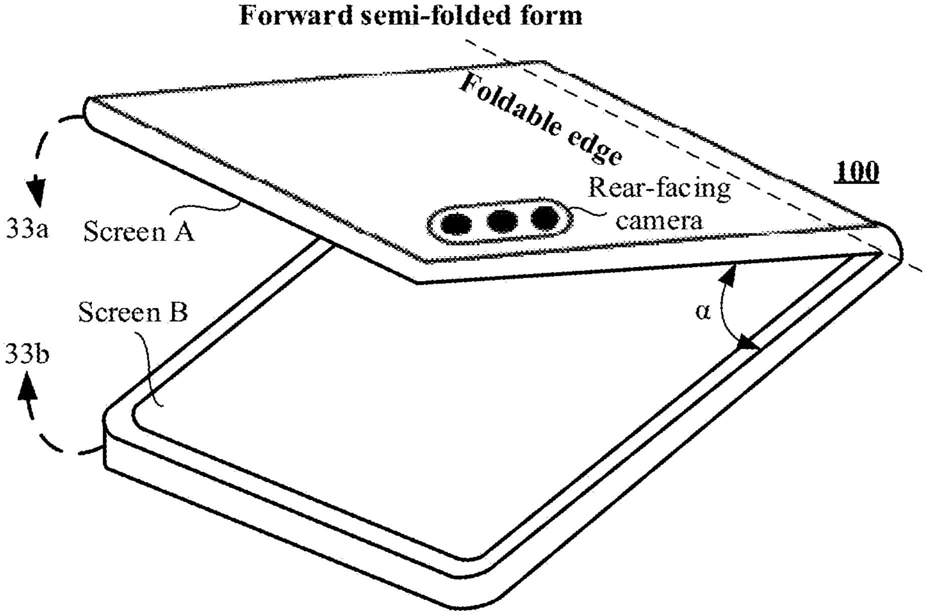

FIG. 2A is a diagram of an expanded form of the transversely foldable screen. As shown in FIG. 2A to FIG. 2D, similar to the longitudinally foldable screen, the transversely foldable screen shown in FIG. 2A is folded inward along the foldable edge in a direction 33*a* and/or a direction 33*b*, to form a screen A and a screen B in forward semi-folded forms shown in FIG. 2B and FIG. 2C; and the transversely foldable screen continues to be folded inward, to form a forward folded form shown in FIG. 2D. In some embodiments of this application, similar to the longitudinally foldable screen, the transversely foldable screen shown in FIG. 2A may further be folded outward along the foldable edge, to form a reverse semi-folded form shown in FIG. 2E; and the transversely foldable screen may further continue to be folded outward, to form a reverse folded form shown in FIG. 2F.

In some embodiments of this application, the electronic device 100 may determine, based on a detected included angle $\alpha$ between the screen A and the screen B, a form of the configured foldable screen. For example, when $\alpha \in [0°, P1)$, the electronic device 100 may determine that the foldable screen is in the forward folded form; or when $\alpha \in [P2, 360]$, the electronic device 100 may determine that the foldable screen is in the reverse folded form. Herein, P1 and P2 may be preset error values set by the electronic device 100 or the user. For example, P1 and P2 are 5° and 355° respectively.

Figure 3A:
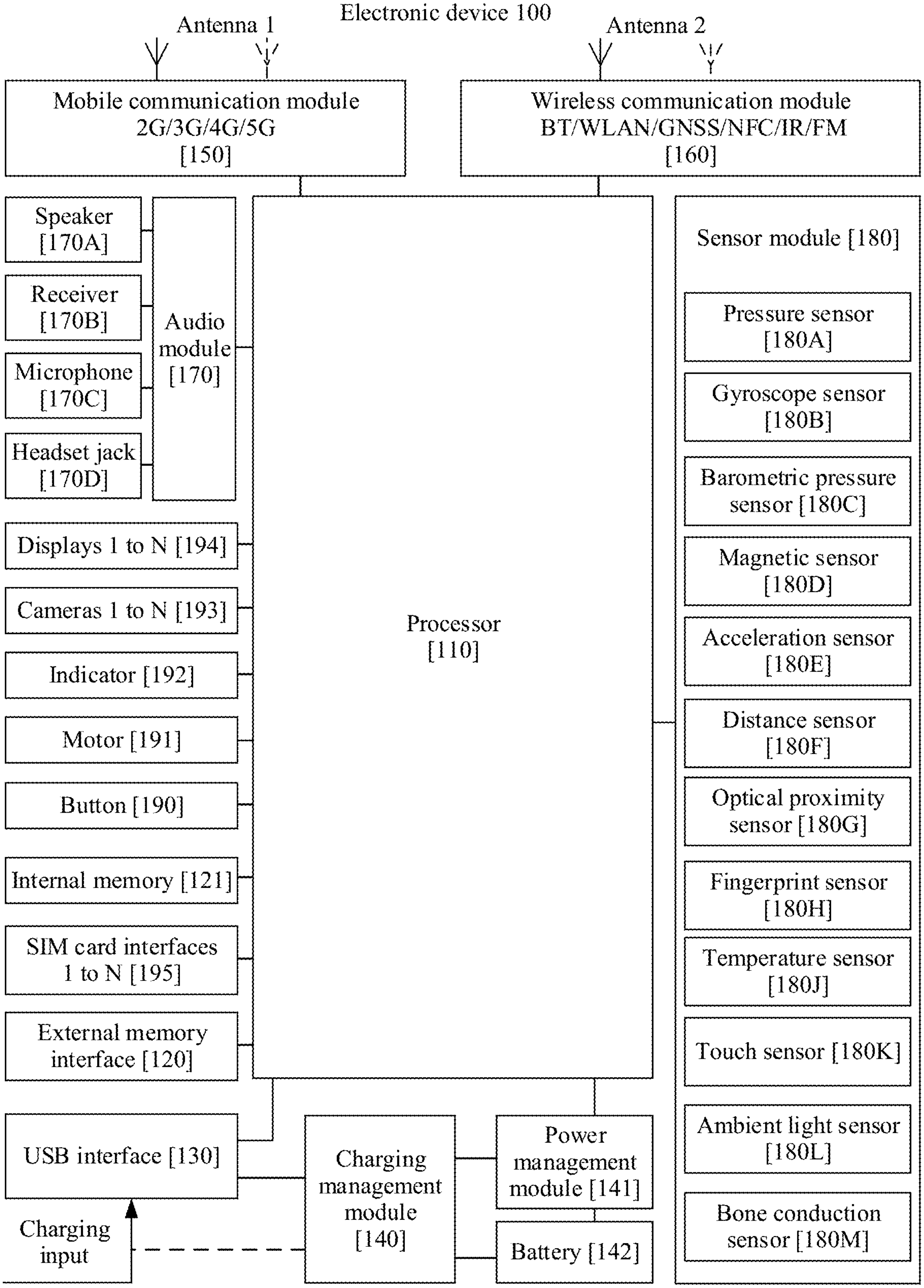
FIG. 3A is a diagram of a structure of an electronic device according to an embodiment of this application.

FIG. 3A is a diagram of a structure of an electronic device 100.

The electronic device 100 may be a mobile phone, a tablet computer, a desktop computer, a laptop computer, a handheld computer, a notebook computer, an ultra-mobile personal computer (UMPC), a netbook, a cellular phone, or a personal digital assistant (PDA), an augmented reality (AR) device, a virtual reality (VR) device, an artificial intelligence (AI) device, a wearable device, a vehicle-mounted device, a smart home device, and/or a smart city device. The electronic device may run an iOS, Android, Microsoft, or another operating system. A specific type of the electronic device is not limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of the present invention does not constitute a specific limitation on the electronic device 100. In some other embodiments of this application, the electronic device 100 may include more or fewer components than those shown in the figure, or a combination of a part of the components, or splits from a part of the components, or an arrangement of different components. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments of this application, the memory in the processor 110 is a cache. The memory may store the instructions or the data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments of this application, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments of this application, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments of this application, the processor 110 may include a plurality of groups of I2S buses. The processor 110 may be coupled to the audio module 170 through the I2S bus, to implement communication between the processor 110 and the audio module 170. In some embodiments of this application, the audio module 170 may transmit an audio signal to the wireless communication module 160 through the I2S interface, to implement a function of answering a call through a Bluetooth headset.

The PCM interface may also be used to perform audio communication, and sample, quantize, and encode an analog signal. In some embodiments of this application, the audio module 170 may be coupled to the wireless communication module 160 through the PCM bus interface. In some embodiments of this application, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a bidirectional communication bus. The bus converts to-be-transmitted data between serial communication and parallel communication. In some embodiments of this application, the UART interface is usually configured to connect the processor 110 and the wireless communication module 160. For example, the processor 110 communicates with a Bluetooth module in the wireless communication module 160 through the UART interface, to implement a Bluetooth function. In some embodiments of this application, the audio module 170 may transmit an audio signal to the wireless communication module 160 through the UART interface, to implement a function of playing music through the Bluetooth headset.

The MIPI interface may be configured to connect the processor 110 and a peripheral component like the display 194 or the camera 193. The MIPI interface includes a camera serial interface (CSI), a display serial interface (DSI), and the like. In some embodiments of this application, the processor 110 communicates with the camera 193 through the CSI interface, to implement an image shooting function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments of this application, the GPIO interface may be configured to connect the processor 110 and the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to perform data transmission between the electronic device 100 and a peripheral device, or may be configured to connect to a headset for playing audio through the headset. The interface may be further configured to connect to another electronic device like an AR device.

It may be understood that an interface connection relationship between the modules that is shown in embodiments of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/

5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments of this application, at least some functional modules of the mobile communication module 150 may be disposed in the processor 110. In some embodiments of this application, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal by using an audio device (which is not limited to the speaker 170A, or the receiver 170B), or displays an image or a video on the display 194. In some embodiments of this application, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs demodulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments of this application, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing, and connects the display 194 and the application processor. The GPU is configured to: perform mathematical and geometric computation, and render an image. The processor 110 may include one or more GPUs, which execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments of this application, the electronic device 100 may include one or N displays 194, where N is a positive integer greater than 1.

The electronic device 100 may implement an image shooting function by using the ISP, the camera 193, the video codec, the GPU, the display 194, the application processor, and the like.

The ISP is configured to process data fed back by the camera 193. For example, during image shooting, a shutter is pressed, and light is emitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, and brightness of the image. The ISP may further optimize parameters such as exposure and a color temperature of an image shooting scene. In some embodiments of this application, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments of this application, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (NN) computing processor, quickly processes input information by referring to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented by using the NPU.

The internal memory 121 may include one or more random access memories (RAM) and one or more non-volatile memories (NVM).

The random access memory may include a static random access memory (SRAM), a dynamic random access memory (DRAM), a synchronous dynamic random access memory (SDRAM), a double data rate synchronous dynamic random access memory (DDR SDRAM, for example, a fifth generation DDR SDRAM is generally referred to as a DDR5 SDRAM), and the like. The non-volatile memory may include a magnetic disk storage device, a flash memory, and the like.

The flash memory may be classified into an NOR flash, an NAND flash, a 3D NAND flash, and the like according to an operation principle; may be classified into a single-level cell (SLC), a multi-level cell (MLC), a triple-level cell (TLC), a quad-level cell (QLC), and the like based on a quantity of electric potential levels of a cell; or may be classified into a universal flash storage (UFS), an embedded multi-media card (eMMC), and the like according to storage specifications.

The random access memory may be directly read and written by using the processor 110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by using the processor 110.

The external memory interface 120 may be configured to connect to an external non-volatile memory, to expand a storage capability of the electronic device 100. The external non-volatile memory communicates with the processor 110 through the external memory interface 120, to implement a data storage function. For example, files such as music and videos are stored in the external non-volatile memory.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments of this application, the audio module 170 may be disposed in the processor 110, or some functional modules in the audio module 170 are disposed in the processor 110.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments of this application, the pressure sensor 180A may be disposed on the display 194.

The gyroscope sensor 180B may be configured to determine a motion posture of the electronic device 100. In some embodiments of this application, angular velocities of the electronic device 100 around three axes (axes x, y, and z) may be determined by using the gyroscope sensor 180B. The gyroscope sensor 180B may be configured to implement image shooting stabilization during image shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement stabilization. The gyroscope sensor 180B may also be used in a navigation scenario and a somatic game scenario.

Figure 3B:
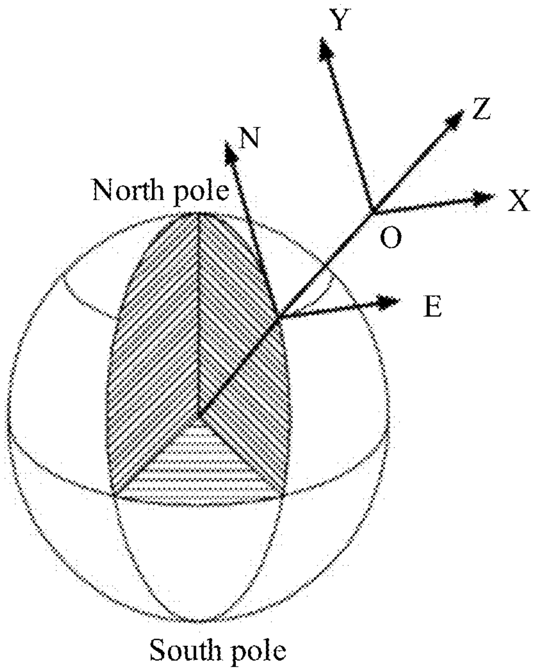
FIG. 3B is a diagram of a geographic coordinate system according to an embodiment of this application.

It should be noted that a coordinate system of the gyroscope sensor is a geographic coordinate system. As shown in FIG. 3B, in the geographic coordinate system, an origin O is located at a point at which a carrier is located, an axis X points to the east (E) along a local latitude line, an axis Y points to the north (N) along a local meridian, and an axis Z points upward along a local geographic vertical and forms a right-hand rectangular coordinate system with the axis X and the axis Y. The carrier is a device including a gyroscope sensor, for example, the electronic device 100.

In some embodiments of this application, the display 194 of the electronic device 100 may be folded to form a plurality of displays, for example, a screen A and a screen B. The gyroscope sensor 180B may be disposed on each screen, and is configured to measure an orientation of the display, namely, a direction vector that is perpendicular to the display and that points from the inside of the electronic device 100 to the outside. The electronic device 100 may determine, based on a change of the orientation that is of each display and that is measured by using the gyroscope sensor 180B, an included angle between adjacent screens, for example, an included angle $\alpha$ between the screen A and the screen B.

As shown in FIG. 1A to FIG. 2F, the display 194 of the electronic device 100 may be folded to form the screen A and the screen B that are adjacent to each other. A gyroscope sensor A is disposed on the screen A, and an orientation of the screen A may be measured by using the gyroscope sensor A. A gyroscope sensor B is disposed on the screen B, and an orientation of the screen B may be measured by using the gyroscope sensor B. The following specifically describes a principle of obtaining the included angle $\alpha$ between the screen A and the screen B.

Figure 3C:
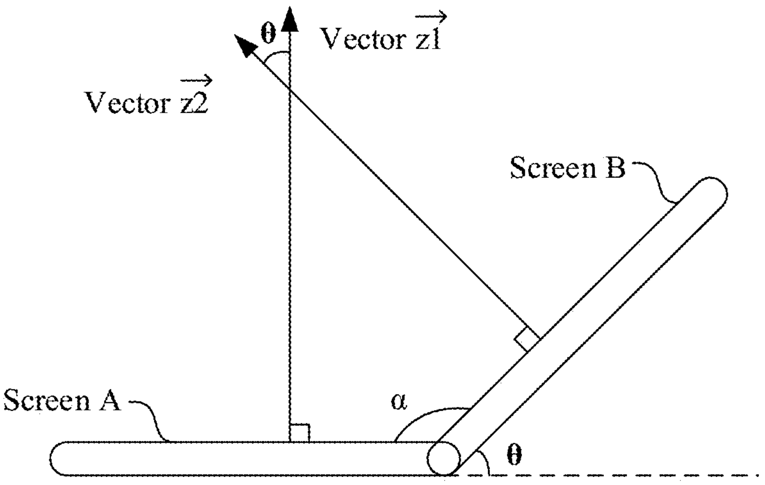
FIG. 3C is a diagram of an included angle of a foldable screen according to an embodiment of this application.

For example, FIG. 3C is a diagram of the included angle $\alpha$ between the screen A and the screen B. As shown in FIG. 3C, the electronic device 100 uses the gyroscope sensor A to learn, through measurement, that the orientation of the screen A is a vector $\vec{z1}$, and uses the gyroscope sensor B to learn, through measurement, that the orientation of the screen B is a vector $\vec{z2}$. The vector $\vec{z1}$ is perpendicular to the screen A, and the vector $\vec{z2}$ is perpendicular to the screen B. The electronic device 100 may calculate an included angle θ between the vector $\vec{z1}$ and the vector $\vec{z2}$ according to Formula (1), so that the electronic device 100 can determine that the included angle α between the screen A and the screen B is equal to (180°−θ).

$$\theta = \arccos\left(\frac{\vec{z1}\cdot\vec{z2}}{|\vec{z1}|\times|\vec{z2}|}\right) \quad \text{Formula (1)}$$

It should be noted that, although a location of the gyroscope sensor A on the screen A and a location of the gyroscope sensor B on the screen B do not overlap, that is, origins of coordinate systems of the two gyroscope sensors do not overlap, two axes X of the two coordinate systems are parallel, two axes Y of the two coordinate systems are parallel, and two axes Z of the two coordinate systems are also parallel. In this way, although the vector $\vec{z1}$ and the vector $\vec{z2}$ are measured in different coordinate systems by using different gyroscope sensors, because the axes of the coordinate systems of the two gyroscope sensors are parallel, the electronic device 100 can calculate the included angle θ between the vector $\vec{z1}$ and the vector $\vec{z2}$ according to Formula (1).

In some embodiments of this application, the gyroscope sensor may be a virtual gyroscope sensor formed by cooperation of a plurality of other sensors. The virtual gyroscope sensor may be configured to calculate an included angle between adjacent screens of the foldable screen, for example, the included angle α between the screen A and the screen B.

The barometric pressure sensor 180C is configured to measure barometric pressure.

The magnetic sensor 180D includes a Hall effect sensor. The electronic device 100 may detect opening and closing of a flip cover by using the magnetic sensor 180D. In some embodiments of this application, when the electronic device 100 is a flip phone, the electronic device 100 can detect opening and closing of a flip cover by using the magnetic sensor 180D. Further, a feature like automatic unlocking of the flip cover is set based on a detected opening or closing state of the flip cover.

In some embodiments of this application, the display 194 of the electronic device 100 may be folded to form a plurality of displays, for example, a screen A and a screen B. One Hall effect sensor may be disposed on each of some or all of the plurality of displays. The electronic device 100 may detect, by using the Hall effect sensor, whether adjacent screens of the foldable screen are in a forward folded state. For example, in the foldable screen of the electronic device 100, a Hall effect sensor is disposed on the screen A, and a magnet is disposed on the screen B. When the user completely folds the electronic device 100 inward, that is, folds the foldable screen into a forward folded state, the Hall effect sensor on the screen A approaches the magnet on the screen B, the Hall effect sensor senses a change of a magnetic field, and generates data 1, and the data 1 may indicate that the screen A and the screen B are in the forward folded state.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in switching between a landscape mode and a portrait mode, a pedometer, or another application.

In some embodiments of this application, the display 194 of the electronic device 100 may be folded to form a plurality of displays, for example, a screen A and a screen B. One acceleration sensor may be disposed on each display of the foldable screen. The electronic device 100 may measure, by using the acceleration sensor, a motion acceleration when each display is rotated; and then calculate, based on the measured motion acceleration, an angle at which one display rotates relative to another display, for example, an included angle α between the screen A and the screen B.

In some embodiments of this application, an angle sensor is mounted on a folded part of the electronic device 100. For example, the folded part includes a rotating shaft. The electronic device 100 may measure, by using the angle sensor, an included angle between adjacent screens of the foldable screen, for example, an included angle α formed between a screen A and a screen B.

The distance sensor 180F is configured to measure a distance. The electronic device 100 may measure the distance in an infrared manner or a laser manner.

The optical proximity sensor 180G may include, for example, a light-emitting diode (LED) and an optical detector, for example, a photodiode.

The ambient light sensor 180L is configured to sense ambient light brightness.

The fingerprint sensor 180H is configured to collect a fingerprint.

The temperature sensor 180J is configured to detect a temperature. In some embodiments of this application, the electronic device 100 executes a temperature processing policy based on the temperature detected by the temperature sensor 180J.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may also be disposed on a surface of the electronic device 100 at a location different from that of the display 194.

The bone conduction sensor 180M may obtain a vibration signal. In some embodiments of this application, the bone conduction sensor 180M may obtain a vibration signal of a vibration bone of a human vocal-cord part, and receive a blood pressure beating signal.

The button 190 includes a power button, a volume up button, a volume down button, and the like. The button 190 may be a mechanical button, or may be a touch button. The electronic device 100 may receive a button input, and generate a button signal input related to a user setting and function control of the electronic device 100. In some embodiments of this application, the button 190 may further include a button for activating/deactivating a privacy mode.

The motor 191 may generate a vibration prompt.

The indicator 192 may be an indicator light, and may be configured to indicate a charging status, a power change, a message, a notification, and the like.

The SIM card interface 195 is configured to connect to a SIM card.

A software system of the electronic device 100 may use a layered architecture, an event-driven architecture, a micro-kernel architecture, a micro service architecture, or a cloud architecture. In this embodiment of the present invention, the Android system of a layered architecture is used as an example to illustrate a software structure of the electronic device 100.

Figure 4A:
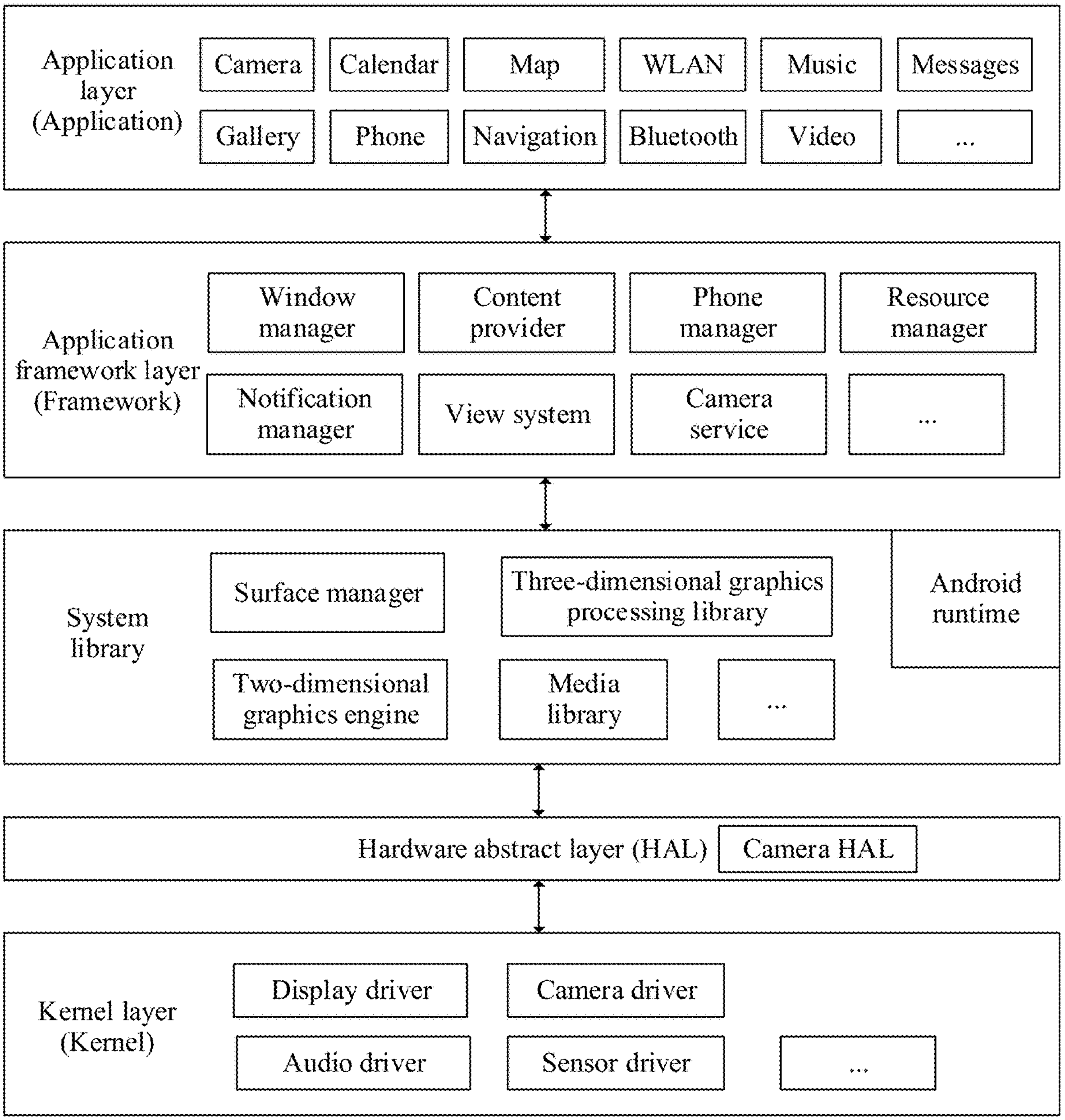
FIG. 4A is a block diagram of a software structure according to an embodiment of this application.

FIG. 4A is a block diagram of a software structure of an electronic device 100 according to an embodiment of the present invention.

Software may include several layers, and each layer has a clear role and task. The layers communicate with each other through a software interface. In some embodiments of this application, the Android system includes an application layer, an application framework layer, an Android runtime and a system library, a hardware abstraction layer (HAL), and a kernel layer from top to bottom.

The application layer may include a series of application packages.

As shown in FIG. 4A, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 4A, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, or the like.

The content provider is configured to: store and obtain data, and enable the data to be accessible to an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including a notification icon of Messages may include a view for displaying a text and a view for displaying an image.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message, which may automatically disappear after a short pause without requiring a user interaction. For example, the notification manager is configured to: notify download completion, give a message notification, and the like. The notification manager may alternatively be a notification that appears in a top status bar of the system in a form of graph or scroll bar text, for example, a notification of an application that is run on a background, or may be a notification that appears on the screen in a form of dialog window. For example, text information is prompted in the status bar, an alert tone is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer (HAL) is an interface layer located between an operating system kernel and a hardware circuit, and aims to abstract hardware and provide a virtual hardware platform for the operating system.

The kernel layer is a layer between hardware and software. The kernel layer may receive HAL layer data and transfer sensor data to the HAL layer. The kernel layer includes at least a display driver, a camera driver, an audio driver, and a sensor driver.

Figure 4B:
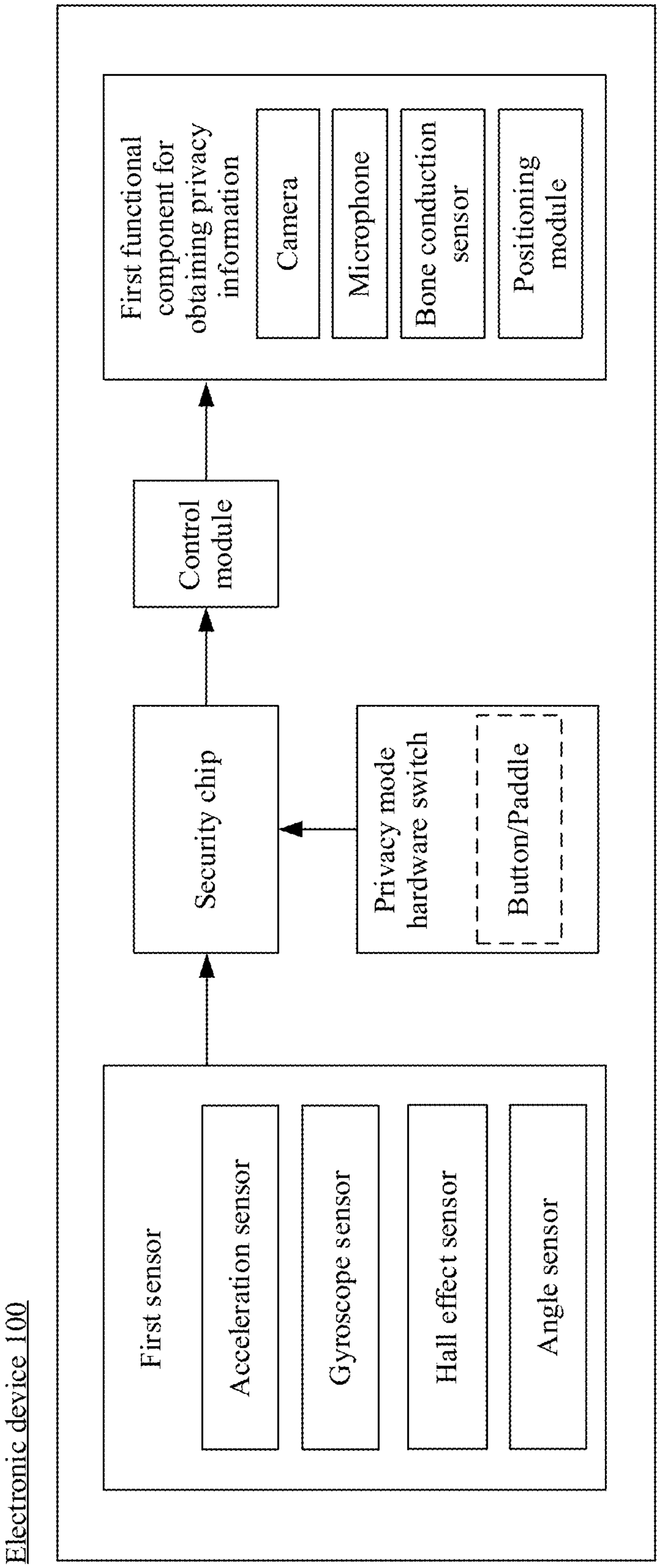
FIG. 4B is a diagram of a hardware apparatus of an electronic device according to an embodiment of this application.

As shown in FIG. 4B, a hardware apparatus of the electronic device 100 may include a first functional component for obtaining privacy information. The first functional component may include some or all of a camera, a microphone, a bone conduction sensor, a positioning module, and the like. For example, the positioning module includes a GPS locator. The camera may capture an image around the electronic device 100, the microphone may record a sound around the electronic device 100, the bone conduction sensor may collect indicators such as a heartbeat and blood pressure of a user, and the positioning module may obtain location information of the electronic device 100.

Some third-party applications may collect data by using the foregoing functional components, to obtain privacy information of the user without awareness of the user. The following uses the camera as an example to describe how the third-party application obtains data collected by a privacy information obtaining module. The application framework layer may further include a camera server, and the hard abstraction layer may further include a camera HAL. The camera server is used to provide a specific service implementation rule. The camera HAL may provide a standard calling interface, and the interface helps an application correctly operate the camera, so that a hardware function of the camera is correctly implemented. When the third-party application expects to collect data by using the camera, the third-party application calls the camera server through a preset API to start a specified camera, the camera server establishes a connection to the camera HAL, the camera HAL calls a camera driver to drive the specified camera to start, the camera server delivers an obtaining request to the camera HAL, and based on the obtaining request, after the camera HAL receives image data that is collected by the camera and that is fed back by the camera driver, the camera HAL sends the image data to the third-party application by using the camera server. It should be noted that the foregoing process in which the third-party application calls the camera to collect the data is a simplified example process, and an actual software calling process is usually more complex.

Currently, an intelligent terminal may prevent, at a software layer, the third-party application from stealing user information by using the first functional component. For example, a privacy mode switch is set on a user interface of the intelligent terminal. After the user activates a privacy mode by using the switch, when the third-party application requests to obtain audio data collected by the camera, the image data collected by the camera is replaced with null data at a software driver layer, and the null data is sent to the third-party application by using the camera server.

However, the third-party application may unauthorizedly obtain a root permission of a device. The root permission is similar to an Administrator permission in a Windows system. The root account is a super administrator account in the system. A user of the account has a highest permission of the entire system and can easily delete or modify software modules in the system. Therefore, the third-party application may control, based on the root permission, the privacy mode switch at the software layer, to obtain data collected by the first functional component. In this case, information security of the user is not fully ensured.

In the component control method and the related apparatus provided in this application, when the privacy mode is activated, power supplying to the first functional component is stopped, and the first functional component can no longer collect data. In this way, a case in which the third-party application can still obtain, in the privacy mode by using the software system, the data collected by the first functional component is avoided. Further, the privacy mode can be deactivated and power supplying to the first functional component can be restored only through signal control between hardware modules. In this way, after the privacy mode is activated, the third-party application cannot deactivate the privacy mode by using the software system. This further ensures information security of the user and improves use experience.

As shown in FIG. 4B, the hardware apparatus of the electronic device 100 may further include some or all of the following: a control module, a security chip, a privacy mode hardware switch, and a first sensor. The first functional component, the control module, the privacy mode hardware switch, and the first sensor may be separately directly or indirectly connected to the security chip through a circuit wire, and perform signal transmission to the security chip through the circuit wire. The control module is used as an example. It may be understood that when the control module and the security chip directly perform signal transmission through the circuit wire, a signal does not pass through the software system, and the third-party APP cannot forge or change, by using the software system, the signal transmitted between the control module and the security chip. There may be another hardware module connected between the security chip and the control module, the first functional component, the privacy mode hardware switch, and the first sensor. This is not specifically limited herein. For example, a control module may be connected between the first functional component and the security chip, and the control module may be configured to control the first functional component to be connected to or disconnected from a power supply. For example, an analog-to-digital conversion module may be connected between the hardware switch (or the first sensor) and the security chip, and the analog-to-digital conversion module may be configured to convert, into a digital signal, an analog signal sent by the hardware switch (or the first sensor), to help the security chip receive the digital signal. For example, the analog-to-digital conversion module includes a sensor hub.

In this embodiment of this application, the first functional component needs to be powered by the power supply to work normally. The control module is configured to disconnect/restore a connection between the first functional component and the power supply of the electronic device 100. In an implementation, the control module may include the foregoing power management module 141, and the power management module 141 is configured to manage power supplying to each functional component. In an implementation, the control module and the first functional component are a same module, that is, the first functional component may control the module to be disconnected from or connected to the power supply. In an implementation, the control module may include a power switch, where the power switch may control opening and closing of the switch, and the power switch is disposed between each first functional component and the power supply of the electronic device 100; when the power switch is in an open state, the first functional component is disconnected from the power supply; and when the power switch is in a closed state, the first functional component is connected to the power supply.

A function of the security chip includes sending an instruction to the control module, and the control module controls, based on the instruction, the first functional component to be connected to/disconnected from the power supply. The security chip is a trusted platform module, is an apparatus that can independently generate, encrypt, and decrypt keys, and has an independent processor and storage unit inside. The security chip performs high-reliability encryption processing on data stored in the security chip, so that the data is difficult to be stolen and tampered with. The third-party application cannot obtain the data in the security chip, and cannot tamper with or forge the instruction sent by the security chip.

A function of the hardware switch includes activating/deactivating the privacy mode, that is, the electronic device 100 is preset with an input operation 1 that is performed by using the hardware switch and that is used to activate the privacy mode, and/or an input operation 2 that is performed by using the hardware switch and that is used to deactivate the privacy mode. When the user performs the input operation 1 or the input operation 2, the hardware switch may generate a corresponding switch signal based on an input operation, for example, a signal 1 generated based on the input operation 1 and a signal 2 generated based on the input operation 2. The hardware switch directly sends the switch signal to the security chip through a circuit wire. The security chip may determine, based on the switch signal, to activate/deactivate the privacy mode. When determining to activate the privacy mode, the security chip sends a power-off instruction to the control module, where the power-off instruction indicates to stop power supplying to the first functional component; or when determining to deactivate the privacy mode, the security chip sends a power-on instruction to the control module, where the power-on instruction indicates to connect the power supply and the first functional component, to restore power supplying to the first functional component.

It should be noted that an actual function of the hardware switch includes controlling stopping or restoring of power supplying to the first functional component. In an application scenario, that the electronic device 100 activates the privacy mode includes that the electronic device 100 stops power supplying to the first functional component, and that the electronic device 100 deactivates the privacy mode includes that the electronic device 100 restores power supplying to the first functional component. In this application scenario, theoretically, the hardware switch may be used to control activating and deactivating of the privacy mode.

In this embodiment of this application, the hardware switch may include one or more function buttons, such as a power button, a smart assistant button, a volume up button, and a volume down button, or may include a newly added function button dedicated to activating/deactivating the privacy mode, or may include a newly added paddle dedicated to activating/deactivating the privacy mode.

In some embodiments of this application, the input operation 1 and the input operation 2 that are performed by using the hardware switch do not conflict with service logic of the hardware switch. The following uses the input operation 1 and the signal 1 as an example for description. For example, the hardware switch includes the power button, and the input operation 1 for activating the privacy mode includes consecutively pressing the power button for three times. When the user performs the input operation 1, the power button generates the signal 1, and the signal 1 includes three consecutive high electrical levels. When detecting three consecutive high electrical levels sent by the power button within preset time 1, for example, the preset time 1 is 2 s, the security chip determines to activate the privacy mode. For example, the hardware switch includes the volume up button and the volume down button, and the input operation 1 for activating the privacy mode includes simultaneously pressing the volume up button and the volume down button. When the user performs the input operation 1, the volume up button and the volume down button each generate a high electrical level. The signal 1 includes high electrical levels respectively generated by the volume up button and the volume down button. When detecting, in the security chip, high electrical levels respectively sent by the volume up button and the volume down button within preset time 2, for example, the preset time 2 is 0.5 s, the security chip determines to activate the privacy mode.

It should be noted that a signal sent by the hardware switch is usually an analog signal, for example, a high electrical level. In an implementation, an analog-to-digital converter may be connected between the hardware switch and the security chip, and the signal 1 received by the security chip is a digital signal obtained by performing analog-to-digital conversion through the analog-to-digital converter. In an implementation, the security chip includes an analog-to-digital converter. After receiving a signal sent by the hardware switch, the security chip converts the signal from an analog signal into a digital signal through the analog-to-digital converter. For example, the signal 1 sent by the power button includes three consecutive high electrical levels, and the signal 1 becomes a digital signal "111" through analog-to-digital conversion.

In this embodiment of this application, for an implementation principle of the input operation 2 and the signal 2, refer to that of the input operation 1 and the signal 1.

In some embodiments of this application, the hardware switch may be configured to implement the input operation 1 and the input operation 2. The input operation 1 and the input operation 2 may be the same or may be different.

In some embodiments of this application, the input operation 1 and the input operation 2 are the same, and the signal 1 and the signal 2 generated by the hardware switch are also the same. The hardware switch sends the signal 1 or the signal 2 to the security chip. After receiving the signal sent by the hardware switch, if the privacy mode currently recorded by the security chip is in an off state, the security chip switches the privacy mode from the off state to an on state; or if the privacy mode currently recorded by the security chip is in the on state, the security chip switches the privacy mode from the on state to the off state. It should be noted that before the user uses the electronic device 100, the security chip may record an initial state of the privacy mode, and the initial state is usually the off state. Certainly, in some implementation solutions, the initial state may alternatively be set to the on state. This is not specifically limited herein.

In some embodiments of this application, the input operation 1 and the input operation 2 are different, and the signal 1 and the signal 2 generated by the hardware switch are also different. The security chip may distinguish the signal 1 from the signal 2, activate the privacy mode based on the signal 1, and deactivate the privacy mode based on the signal 2.

In some embodiments of this application, the hardware switch includes a paddle dedicated to activating/deactivating the privacy mode. The user may move the paddle to either a first location or a second location, where the first location may indicate an on state (ON) of the privacy mode, and the second location may indicate an off state (OFF) of the privacy mode. For example, the input operation 1 includes moving the paddle to the first location, and the signal 1 includes a high electrical level generated by moving the paddle; and the input operation 2 includes moving the paddle to the second location, and the signal 2 includes a low electrical level generated by moving the paddle.

In some embodiments of this application, the hardware switch includes a button dedicated to activating/deactivating the privacy mode. Optionally, the input operation 1 and the input operation 2 each include pressing the button once, and the signal 1 and the signal 2 each include a high electrical level. Optionally, the input operation 1 and the input operation 2 each include pressing and holding the button, and the signal 1 and the signal 2 each include at least N consecutive high electrical levels, where N is a positive integer greater than 1, and a value of N is related to pressing and holding time of the preset input operation 1. Optionally, the input operation 1 includes pressing the button once, and the input operation 2 includes pressing and holding the button.

In some embodiments of this application, the electronic device 100 may include the foldable screen and the first sensor. Sensor data detected by the first sensor may be used to determine whether the foldable screen is in a first posture, for example, the forward folded form. The first sensor may include one or more of a Hall effect sensor, a gyroscope sensor, an acceleration sensor, and an angle sensor. The sensors included in the first sensor each may be directly or indirectly connected to the security chip through a circuit wire. The first sensor may directly transmit the detected sensor data to the security chip through the circuit wire. In an implementation, when determining, based on the sensor data, that the foldable screen is in a preset posture, the security chip sends a power-off instruction to the control module; and when determining that the foldable screen is adjusted from a preset posture to a second posture, the security chip sends a power-on instruction to the control module. For example, the foldable screen is adjusted from the forward folded form to an expanded form. In this embodiment of this application, the first posture may also be referred to as the preset posture.

Similar to the hardware switch, the data detected by the first sensor usually also includes an analog signal. In this embodiment of this application, the analog signal detected by the first sensor may be converted into a digital signal. For details, refer to the related descriptions of the hardware switch. Details are not described herein again.

Figure 2D:
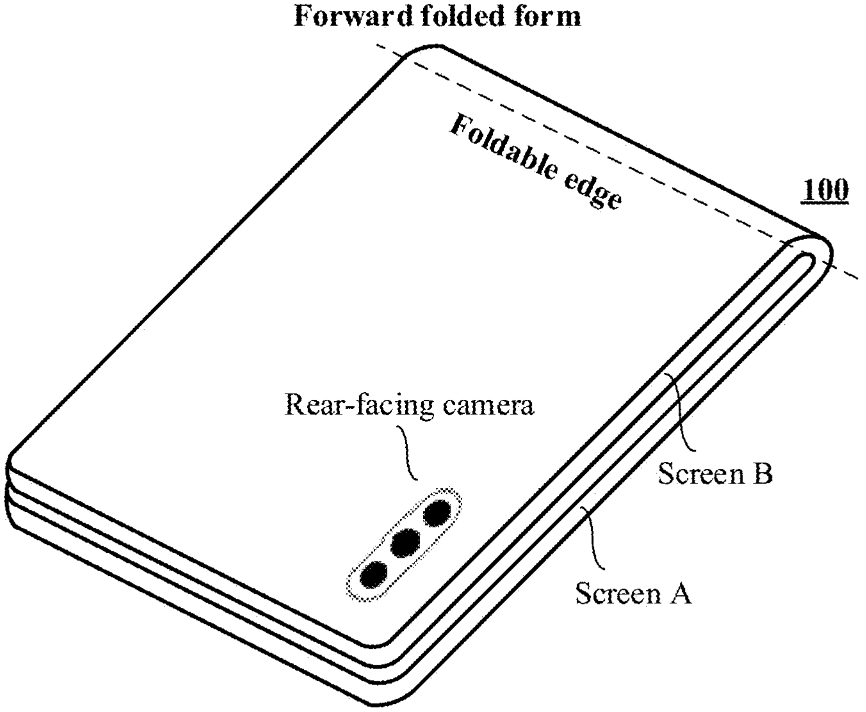
Figure 2E:
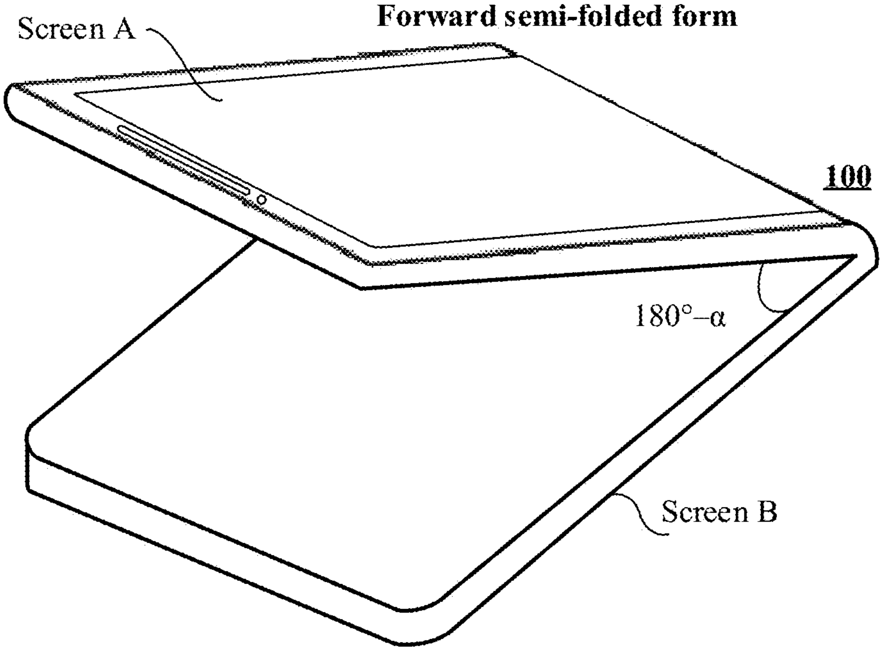
Figure 2F:
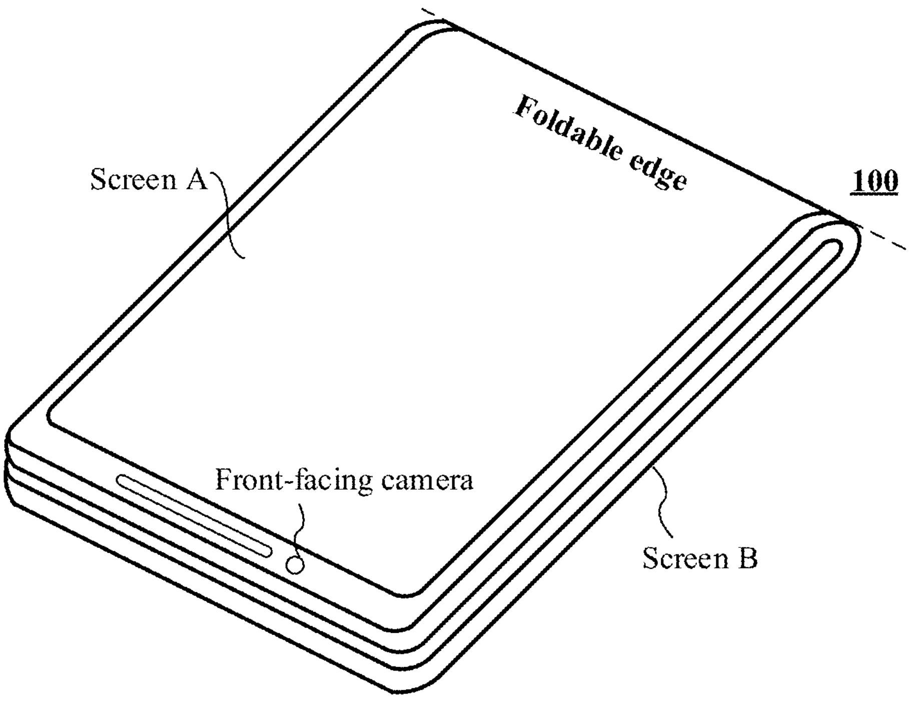

The preset posture is not specifically limited in embodiments of this application. The electronic device 100 may preset the preset posture, or the user may modify the preset posture in the electronic device 100 based on a use habit. Optionally, the preset posture may include any form shown in FIG. 1A to FIG. 2F, and the preset posture is also related to an orientation of the foldable screen. For example, as shown in FIG. 1D and FIG. 2D, the preset posture indicates that the electronic device 100 is in the forward folded form, and an included angle between an orientation of the screen A and the axis Z of the geographic coordinate system is less than a preset angle, for example, 60 degrees. It may be understood that, that the rear side of the screen A includes a rear-facing camera, and the included angle between the orientation of the screen A and the axis Z of the geographic coordinate system is less than the preset angle means that the rear side on which the rear-facing camera is located faces the ground; and that the electronic device 100 is folded forward, and the rear side on which the rear-facing camera is located faces the ground indicates that the user currently has a small intention to use the electronic device.

In an implementation, the security chip sends a power-off instruction to the control module when determining that the foldable screen is in the forward folded form and/or that the privacy mode is activated by using the hardware switch; and the security chip sends a power-on instruction to the control module when determining that the foldable screen is expanded from the forward folded form and/or that the privacy mode is deactivated by using the hardware switch.

With reference to the foregoing hardware structure and software system, the following describes the component control method provided in embodiments of this application.

Figure 5:
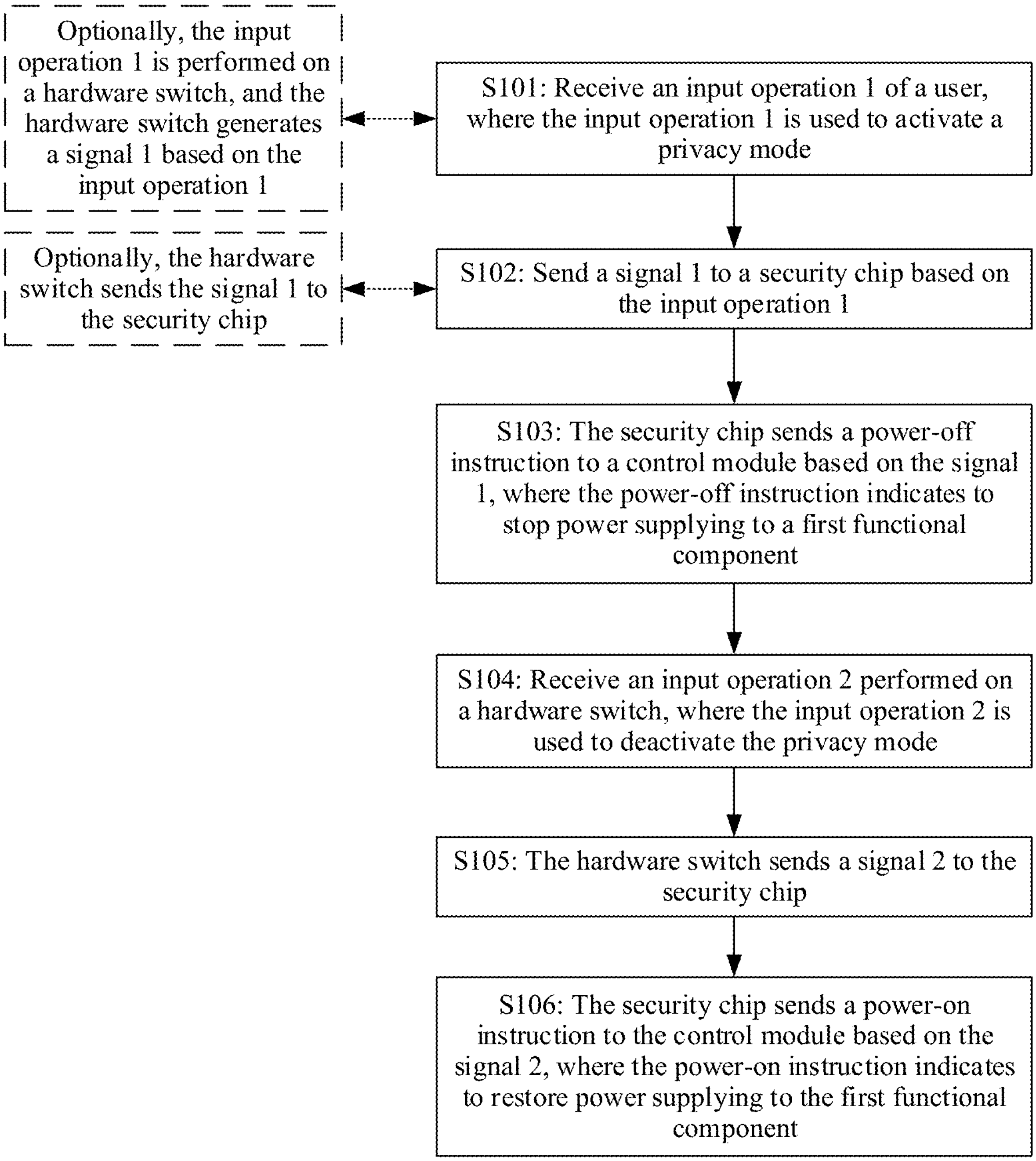
FIG. 5 is a schematic flowchart of a component control method according to an embodiment of this application.

FIG. 5 is a schematic flowchart of a component control method according to an embodiment of this application. The method includes but is not limited to S101 to S106.

S101: An electronic device 100 receives an input operation 1 of a user, where the input operation 1 is used to activate a privacy mode.

S102: The electronic device 100 sends a signal 1 to a security chip based on the input operation 1.

In some embodiments of this application, the electronic device 100 includes a privacy mode hardware switch, and is further preset with the input operation 1 that is performed by using the hardware switch and that is used to activate the privacy mode. The hardware switch is directly or indirectly connected to the security chip through a circuit wire. When the user performs the input operation 1, the hardware switch may generate the signal 1, and directly send the signal 1 to the security chip through the circuit wire, where the signal 1 indicates to activate the privacy mode. For details, refer to the input operation 1 and the signal 1 in the related descriptions in FIG. 4B. Details are not described herein again.

In some embodiments of this application, the input operation 1 may include a touch operation, an air gesture, a voice instruction, or the like, where the touch operation includes but is not limited to tap, double-tap, touch and hold, finger slide, finger drag, knuckle slide, or the like. For example, an example in which the input operation 1 includes tapping a virtual control displayed by the electronic device 100 is used for description. The virtual control may be an on/off icon of the privacy mode. After detecting the input operation 1, a touchscreen of the electronic device 100 transmits related information of the input operation 1 to an application framework layer through a kernel layer. For example, the related information includes a touch location and touch time. The application framework layer identifies that an input event corresponding to the input operation is tapping the on/off icon of the privacy mode, and a response event is activating the privacy mode. The application framework layer sends the signal 1 to the security chip through the kernel layer, where the signal 1 indicates to activate the privacy mode.

S103: The security chip sends a power-off instruction to a control module based on the signal 1, where the power-off instruction indicates to stop power supplying to a first functional component.

Specifically, when determining, based on the signal 1, to activate the privacy mode, the security chip may switch a state of the privacy mode to an on state. When determining to activate the privacy mode, the security chip sends the power-off instruction to the control module, where the power-off instruction indicates to stop power supplying to the first functional component.

In some embodiments of this application, the control module and the first functional component are a same module, the security chip is directly or indirectly connected to each first functional component through the circuit wire, the security chip may send the power-off instruction to each first functional component, and the first functional component may stop, based on the power-off instruction, power supplying to the module.

In some embodiments of this application, the control module includes the foregoing power management module. The security chip is directly or indirectly connected to the power management module through the circuit wire. The security chip sends the power-off instruction to the power management module. The power management module may stop, based on the power-off instruction, power supplying to each first functional component.

In some embodiments of this application, after the first functional component is disconnected from a power supply, the electronic device 100 displays prompt information, where the prompt information prompts that the privacy mode is activated and the first functional component is disconnected from the power supply. In an implementation, the security chip sends indication information 1 to the application framework layer after sending the power-off instruction, and the application framework layer calls, based on the indication information 1, a display module to display the prompt information.

In some embodiments of this application, the privacy mode can be activated only by using the hardware switch. In this way, only the hardware switch can be used to trigger the security chip to send the power-off instruction, the hardware switch, the security chip, the control module, and the first functional component each transmit a signal through the circuit wire, and a third-party application cannot tamper with or forge the power-off instruction sent by the security chip. Therefore, the third-party application cannot activate the privacy mode by using a software system, and cannot control the first functional component to be disconnected from the power supply. It may be understood that after the third-party application maliciously controls first functional components such as a camera, a microphone, a bone conduction sensor, and a positioning module to be powered off, the user cannot use these modules in time, greatly affecting user experience.

S104: The electronic device 100 receives an input operation 2 performed by the user on the hardware switch, where the input operation 2 is used to deactivate the privacy mode.

S105: The hardware switch sends a signal 2 to the security chip.

The electronic device 100 includes the privacy mode hardware switch, and is further preset with the input operation 2 that is performed by using the hardware switch and that is used to deactivate the privacy mode. The hardware switch is directly or indirectly connected to the security chip through the circuit wire. When the user performs the input operation 2, the hardware switch may generate the signal 2, and directly send the signal 2 to the security chip through the circuit wire. For details, refer to the input operation 2 and the signal 2 in the related descriptions in FIG. 4B. Details are not described herein again.

S106: The security chip sends a power-on instruction to the control module based on the signal 2, where the power-on instruction indicates to restore power supplying to the first functional component.

Specifically, the security chip may determine, based on the signal 2, to deactivate the privacy mode, and the security chip may update and record a state of the privacy mode as an off state. When determining to deactivate the privacy mode, the security chip sends the power-on instruction to the control module, where the power-on instruction indicates to restore power supplying to the first functional component.

In some embodiments of this application, the control module and the first functional component are a same module, the security chip is directly or indirectly connected to each first functional component through the circuit wire, the security chip may send the power-on instruction to each of a plurality of first functional components, and the first functional component may restore, based on the power-on instruction, power supplying to the module.

In some embodiments of this application, the control module includes the foregoing power management module. The security chip is directly or indirectly connected to the power management module through the circuit wire. The security chip sends the power-on instruction to the power management module. The power management module may restore, based on the power-on instruction, power supplying to each first functional component.

In some embodiments of this application, after restoring power supplying to the first functional component, the electronic device 100 displays prompt information, where the prompt information prompts that the privacy mode is deactivated and power supplying to the first functional component is restored. In an implementation, the security chip sends indication information 2 to the application framework layer after sending the power-on instruction, and the application framework layer calls, based on the indication information 2, the display module to display the prompt information.

For example, "the hardware switch includes a power button, the first functional component includes the camera, and the input operation 1 and the input operation 2 each include consecutively pressing the power button for three times" is used as an example. FIG. 6A-1 to FIG. 6C-2 are related diagrams in which the user controls, by using the hardware switch, the camera to be disconnected from the power supply or power supplying to the camera to be restored.

Figures 1, 6A:
FIG. 6A-1 to FIG. 6C-2 are diagrams of user interfaces according to an embodiment of this application.
Figures 2, 6A:
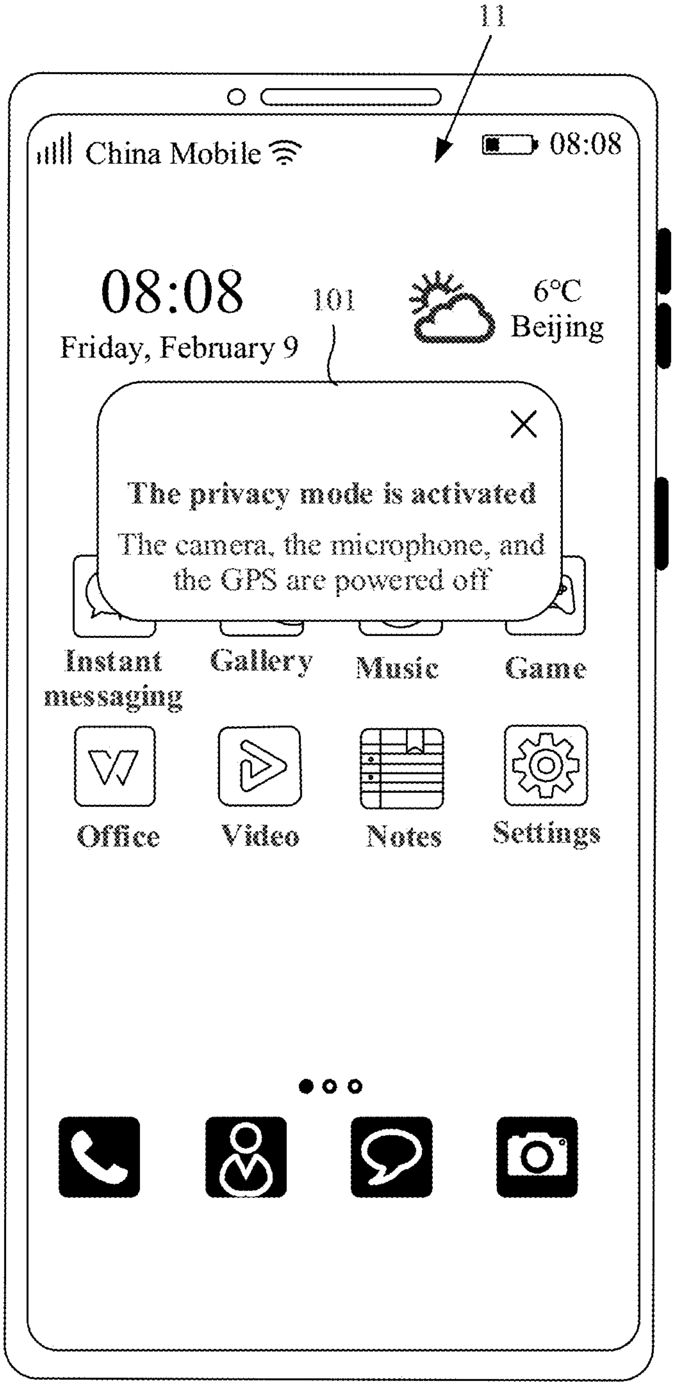
Figures 1, 6B:
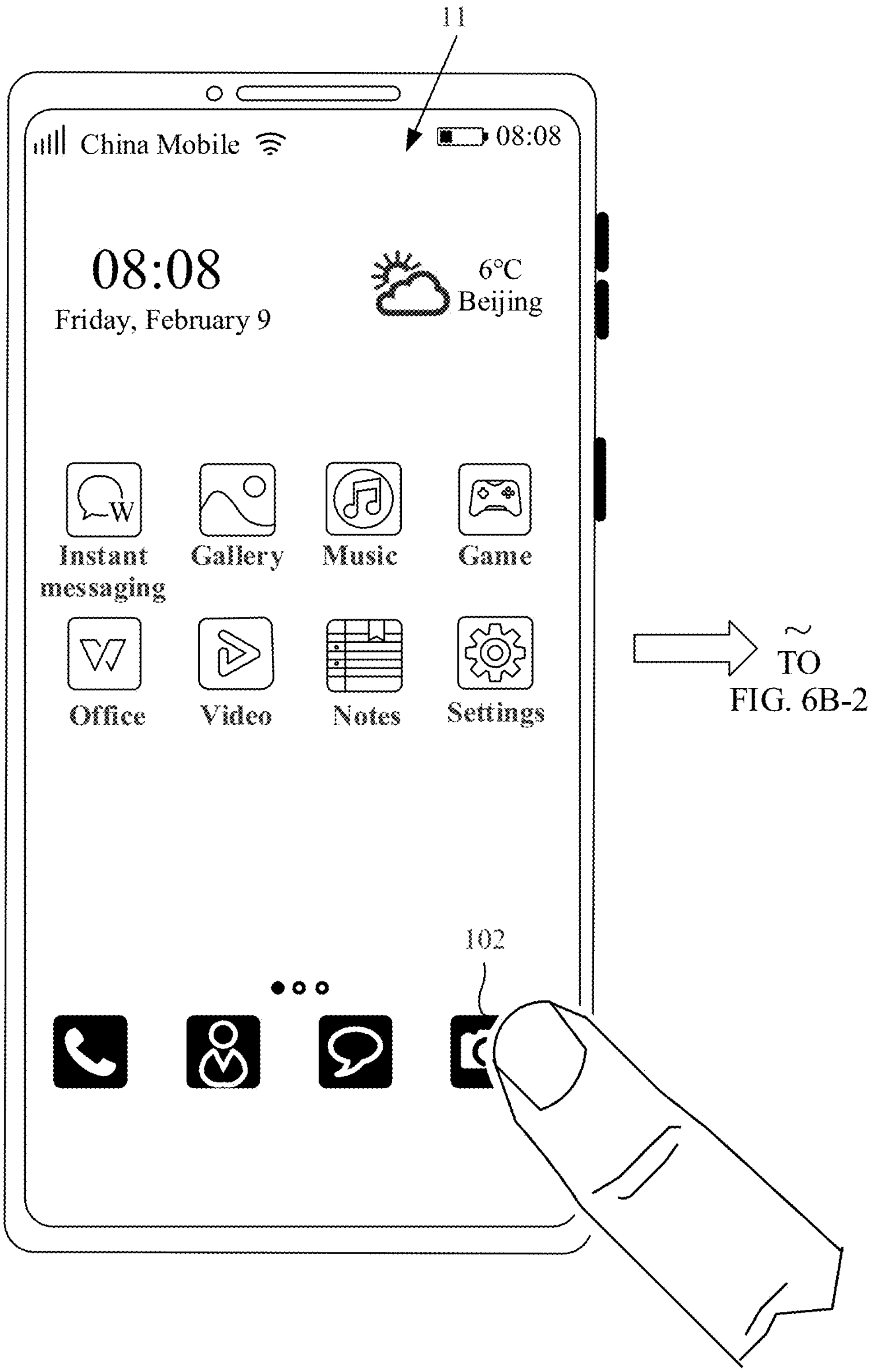
Figures 2, 6B:
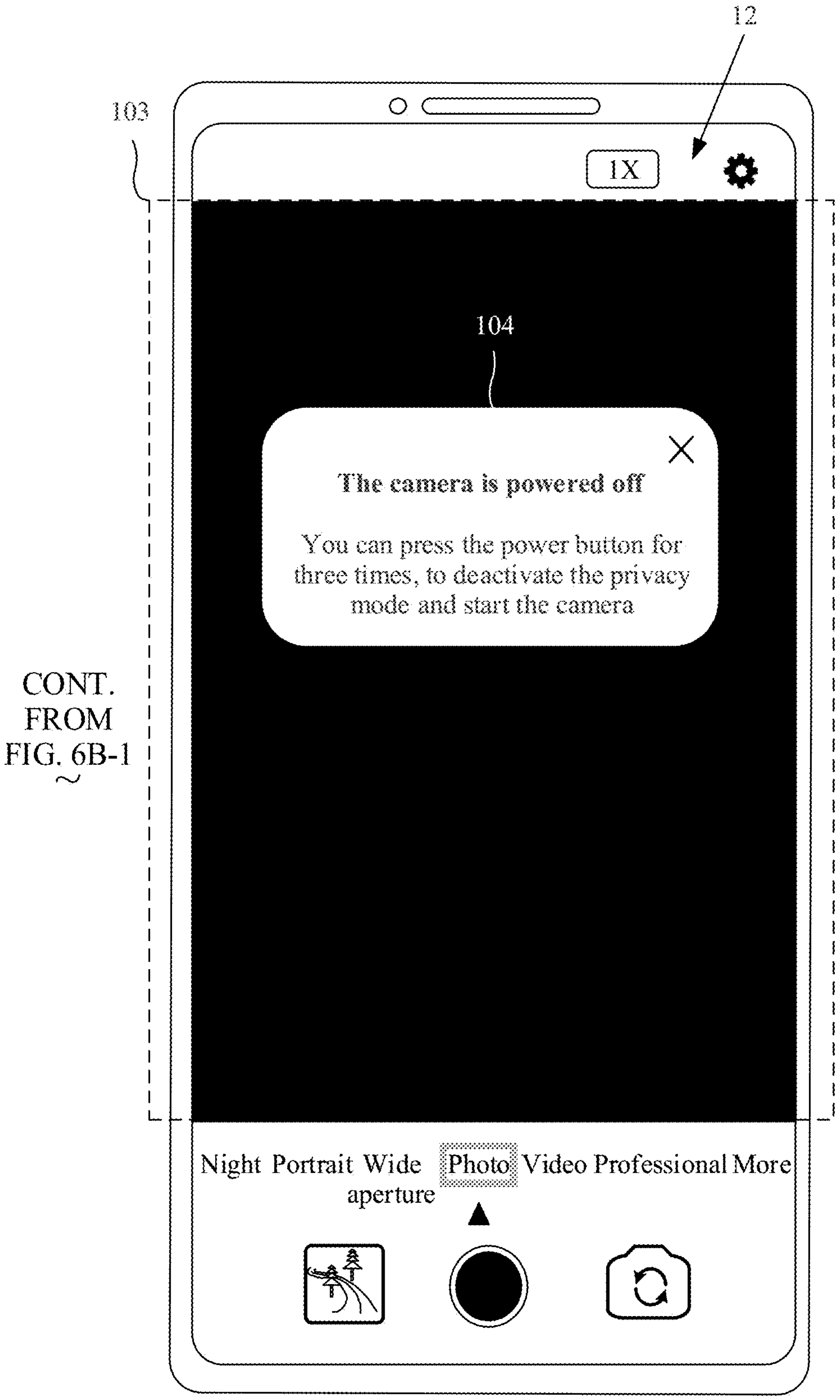
Figures 1, 6C:
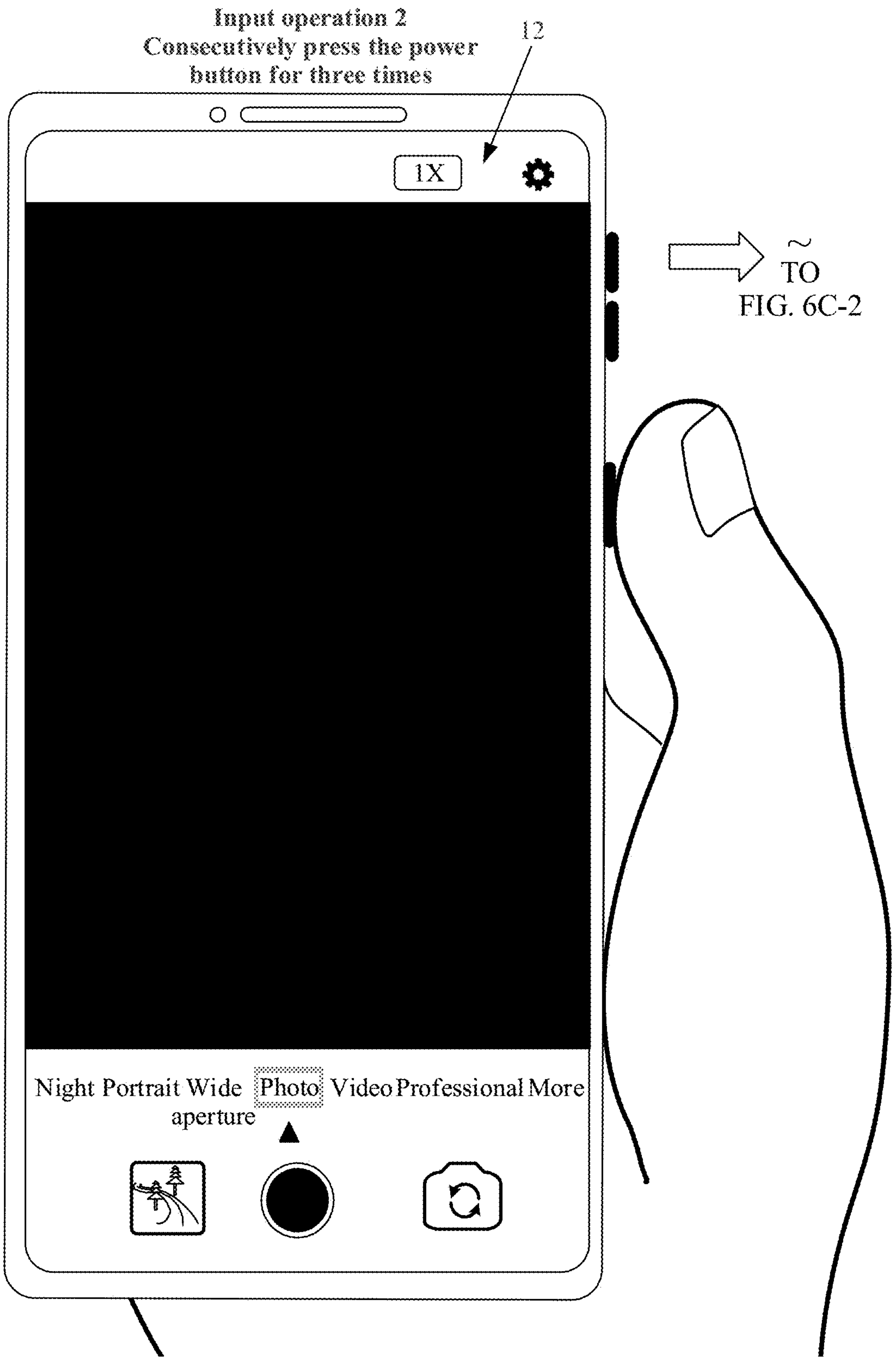
Figures 2, 6C:
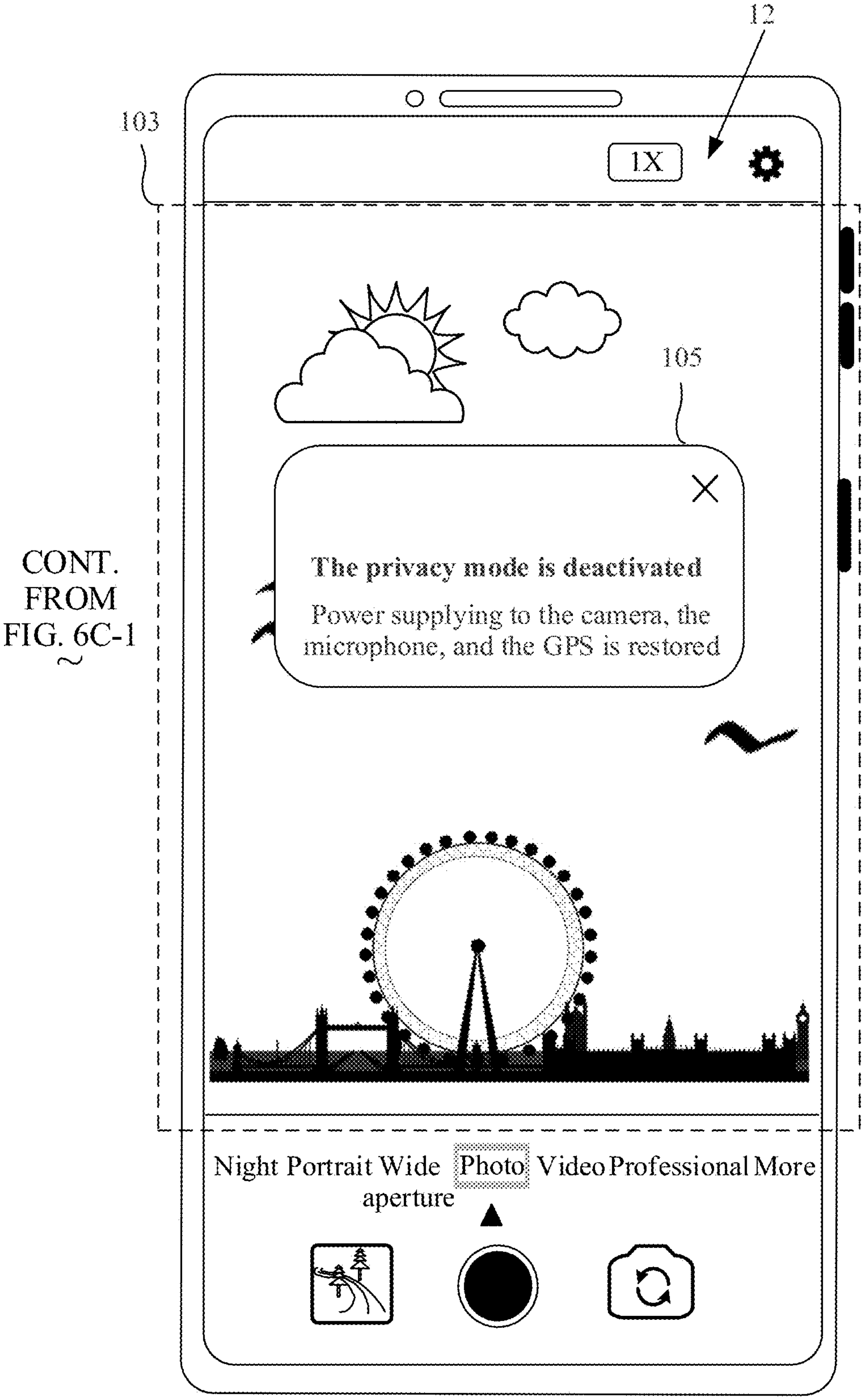

For example, as shown in FIG. 6A-1 and FIG. 6A-2, the electronic device 100 displays a user interface 11; and after the user consecutively presses the power button for three times, a signal generated by the power button triggers the camera to be disconnected from the power supply, and the electronic device 100 displays prompt information 101, where the prompt information 101 prompts that the privacy mode is activated and the camera, the microphone, and a GPS locator are disconnected from the power supply. As shown in FIG. 6B-1, the user interface 11 may include an icon 102 of a camera application; and after the camera is disconnected from the power supply, the user taps the icon 102, to trigger the electronic device 100 to display an image shooting interface 12 of the camera application, where the image shooting interface 12 includes a preview area 103, and the preview area 103 is used to display an image captured by the camera. Because the camera is not connected to the power supply, a black screen image is displayed in the preview area 103 shown in FIG. 6B-2. Optionally, as shown in FIG. 6B-2, the electronic device 100 may further display prompt information 104 on the image shooting interface 12, where the prompt information 104 prompts that the power button may be consecutively pressed for three times to deactivate the privacy mode and start the camera. As shown in FIG. 6C-1 and FIG. 6C-2, after the user consecutively presses the power button for three times, a signal generated by the power button triggers power supplying to the camera to be restored. The electronic device 100 displays, in the preview area 103 of the image shooting interface 12, an image captured by the camera, and may further display prompt information 105, where the prompt information 105 prompts that the privacy mode is deactivated and power supplying to the camera is restored.

In this embodiment of this application, the user deactivates the privacy mode by using the hardware switch. In this way, only the hardware switch can be used to trigger the security chip to send the power-on instruction, the hardware switch, the security chip, the control module, and the first functional component each transmit a signal through the circuit wire, and the third-party application cannot tamper with or forge the power-on instruction sent by the security chip. Therefore, after the first functional component is powered off, only through signal control between hardware modules, power supplying to the first functional component can be triggered to be restored. The third-party application cannot trigger, by using the software system, power supplying to the first functional component to be restored, and naturally cannot further control the first functional component to collect privacy information of the user. This implements a more secure privacy mode, namely, a super privacy mode. In addition, the user may activate and deactivate the privacy mode by using the hardware switch at any time. This implements quick switching between the privacy mode and a normal service, to avoid affecting user experience of the normal service.

It should be noted that an actual function of the input operation 1 includes controlling the first functional component to be powered off, and an actual function of the input operation 2 includes controlling the first functional component to be connected to the power supply again. In an application scenario of the component control method provided in this application, activating the privacy mode by the electronic device 100 includes disconnecting the first functional component from the power supply, and deactivating the privacy mode includes restoring power supplying to the first functional component. Therefore, in this application scenario, theoretically, the input operation 1 is used to activate the privacy mode, and the input operation 2 is used to deactivate the privacy mode. It may be understood that the component control method provided in this embodiment of this application may alternatively be unrelated to the privacy mode.

Figure 7:
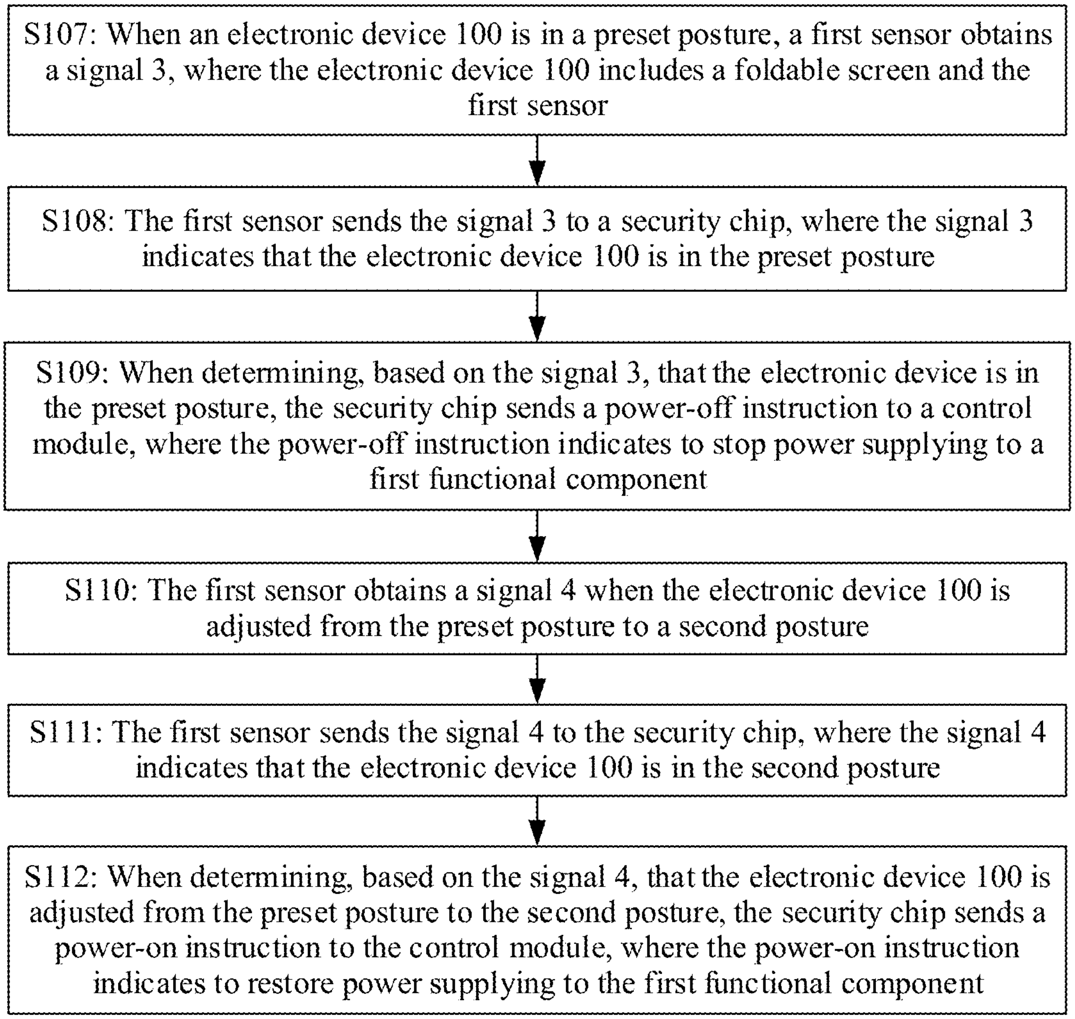
FIG. 7 is a schematic flowchart of another component control method according to an embodiment of this application.

FIG. 7 is a schematic flowchart of another component control method according to an embodiment of this application. The method is applied to an electronic device 100 configured with a foldable screen. The method includes but is not limited to S107 to S112.

S107: When an electronic device 100 is in a preset posture, a first sensor obtains a signal 3, where the electronic device 100 includes a foldable screen and the first sensor.

S108: The first sensor sends the signal 3 to a security chip, where the signal 3 indicates that the electronic device 100 is in the preset posture.

As shown in FIG. 1A to FIG. 1F, the electronic device 100 may include the foldable screen, and the electronic device 100 may divide the foldable screen into a screen A and a screen B along a foldable edge. The electronic device 100 further includes the first sensor. Sensor data detected by the first sensor, for example, the signal 3, may be used to determine whether the electronic device 100 is in the preset posture, for example, the forward folded forms shown in FIG. 1D and FIG. 2D. The first sensor may be directly or indirectly connected to the security chip through the circuit wire. The first sensor may transmit the detected sensor data to the security chip through the circuit wire. The security chip may determine, based on the sensor data, whether the foldable screen is in the preset posture. It may be understood that when a user adjusts a posture of the electronic device 100 to the preset posture, the signal 3 detected by the first sensor may indicate that the electronic device 100 is in the preset posture.

In this embodiment of this application, the first sensor may include one or more of a Hall effect sensor, an angle sensor, a gyroscope sensor, and an acceleration sensor. This is not specifically limited herein.

In some embodiments of this application, the first sensor includes the Hall effect sensor, and the preset posture includes the forward folded form. For example, the Hall effect sensor is disposed on the screen A of the foldable screen, and a magnet is disposed on the screen B. When the user folds the electronic device 100 inward into the forward folded form, the Hall effect sensor on the screen A is close to the magnet on the screen B, a magnetic field strength sensed by the Hall effect sensor exceeds a preset value 1, and the Hall effect sensor outputs a low-level signal. The signal 3 sent by the first sensor to the security chip includes the low-level signal, and the low-level signal may indicate that the posture of the electronic device 100 is adjusted to the forward folded form. It should be noted that the Hall effect sensor in the foregoing example is a switch Hall effect sensor, and the Hall effect sensor in embodiments of this application may alternatively be a latching or a linear Hall effect sensor. This is not specifically limited herein.

In some embodiments of this application, the first sensor includes an angle sensor. The angle sensor is mounted on a folded part of the electronic device 100, for example, a rotating shaft. The electronic device 100 may measure an included angle of adjacent screens of the foldable screen by using the angle sensor, for example, an included angle $\alpha$ between the screen A and the screen B. The signal 3 sent by the first sensor to the security chip includes the included angle $\alpha$. The security chip may determine, based on the included angle $\alpha$, whether the electronic device 100 is in the preset posture. For example, the preset posture includes the forward folded form, and when the included angle $\alpha$ falls within a range of [0°, P1), the security chip determines that the electronic device 100 is in the forward folded form. Herein, P1 may be a preset error value set by the electronic device 100 or the user. For example, P1 may be 5°.

In some embodiments of this application, a gyroscope sensor A is disposed on the screen A, a gyroscope sensor B is disposed on the screen B, and the first sensor includes the gyroscope sensor A and the gyroscope sensor B. The gyroscope sensor A may detect angular velocities of the screen A around three axes of a coordinate system, and the gyroscope sensor B may detect angular velocities of the screen B around the three axes. The signal 3 sent by the first sensor to the security chip includes the angular velocities of the screen A around the three axes and the angular velocities of the screen B around the three axes. The security chip may determine an orientation of the screen A based on the angular velocities of the screen A around the three axes, and determine an orientation of the screen B based on the angular velocities of the screen B around the three axes. The security chip may determine the included angle $\alpha$ between the screen A and the screen B based on the orientations of the screen A and the screen B, and further determine, based on the included angle $\alpha$, whether the electronic device 100 is in the preset posture.

In some embodiments of this application, an acceleration sensor A is disposed on the screen A, an acceleration sensor B is disposed on the screen B, and the first sensor includes the acceleration sensor A and the acceleration sensor B. The acceleration sensor A may detect accelerations of the screen A along three axes of a coordinate system, and the acceleration sensor B may detect accelerations of the screen B along the three axes. The signal 3 sent by the first sensor to the security chip includes the accelerations of the screen A along the three axes and the accelerations of the screen B along the three axes. The security chip may determine, based on the accelerations of the screen A along the three axes and the accelerations of the screen B along the three axes, an angle at which the screen A rotates relative to the screen B, namely, the included angle $\alpha$ between the screen A and the screen B, and may further determine, based on the included angle $\alpha$, whether the electronic device 100 is in the preset posture.

S109: When determining, based on the signal 3, that the electronic device is in the preset posture, the security chip sends a power-off instruction to a control module, where the power-off instruction indicates to stop power supplying to a first functional component.

When determining, based on the signal 3, that the electronic device is in the preset posture, the security chip activates a privacy mode, and updates and records a state of the privacy mode as an on state. When determining to activate the privacy mode, the security chip sends the power-off instruction to the control module. For details, refer to the related descriptions in step S103. Details are not described herein again.

It may be understood that the user folds the posture of the electronic device 100 into the preset posture, to activate the privacy mode, and the security chip identifies the preset posture based on the data detected by the first sensor. In this way, the first sensor is used to trigger the security chip to send the power-off instruction, the first sensor, the security chip, the control module, and the first functional component each transmit a signal through the circuit wire between hardware modules, and a third-party application cannot tamper with or forge the power-off instruction sent by the security chip. Therefore, the third-party application cannot activate the privacy mode by using a software system, and this prevents the third-party application from maliciously controlling the first functional component to be disconnected from a power supply.

S110: The first sensor obtains a signal 4 when the electronic device 100 is adjusted from the preset posture to a second posture.

S111: The first sensor sends the signal 4 to the security chip, where the signal 4 indicates that the electronic device 100 is in the second posture.

The first sensor may transmit the detected sensor data to the security chip in real time through the circuit wire. When the user adjusts the electronic device 100 from the preset posture to the second posture, the signal 4 detected by the first sensor may indicate that the electronic device 100 is in the second posture; and the first sensor transmits the detected signal 4 to the security chip, and the security chip may determine, based on the signal 4, that the electronic device 100 is adjusted from the preset posture to the second posture.

In some embodiments of this application, the second posture includes any posture other than the preset posture. For example, the preset posture includes the forward folded form, and the security chip determines, based on the signal 4, that the electronic device 100 is expanded from the forward folded form. In some embodiments of this application, the second posture includes one or more specific postures. For example, the preset posture includes the forward folded form, and the second posture includes the foregoing expanded form.

In some embodiments of this application, the first sensor includes the Hall effect sensor, and the preset posture includes the forward folded form. For example, when the user expands the electronic device 100 from the forward folded form, the Hall effect sensor on the screen A moves away from the magnet on the screen B, and when the magnetic field strength sensed by the Hall effect sensor is less than a preset value 2, the Hall effect sensor outputs a high-level signal. The signal 4 sent by the first sensor to the security chip includes the high-level signal, and the high-level signal may indicate that the electronic device 100 is expanded from the forward folded form.

In some embodiments of this application, the first sensor includes the angle sensor, the gyroscope sensor, or the acceleration sensor. The security chip may determine the included angle $\alpha$ between the screen A and the screen B based on the signal 4, and then may determine, based on the included angle $\alpha$, whether the electronic device 100 is in the preset posture. For example, when the preset posture includes the forward folded form, and the included angle $\alpha$ does not fall within the range of [0°, P1), it is determined that the electronic device 100 is not in the preset posture. Specifically, for the signal 4, refer to the related descriptions of the signal 3. Details are not described herein again.

S112: When determining, based on the signal 4, that the electronic device 100 is adjusted from the preset posture to the second posture, the security chip sends a power-on instruction to the control module, where the power-on instruction indicates to restore power supplying to the first functional component.

Specifically, when determining, based on the signal 4, that the electronic device 100 is adjusted from the preset posture to the second posture, the security chip deactivates the privacy mode, and updates and records the state of the privacy mode as an off state. When determining to deactivate the privacy mode, the security chip sends the power-on instruction to the control module, where the power-on instruction indicates to restore power supplying to the first functional component. For details, refer to the related descriptions in step S106. Details are not described herein again. It may be understood that the user adjusts the electronic device 100 from the preset posture to the second posture to deactivate the privacy mode, that is, the first sensor is used to trigger power supplying to the first functional component to be restored. In this way, the first sensor is used to trigger the security chip to send the power-on instruction, the first sensor, the security chip, the power management module, and the first functional component each transmit a signal through the circuit wire, and the third-party application cannot tamper with or forge the power-on instruction sent by the security chip. Therefore, after the first functional component is powered off, only through signal control between hardware modules, power supplying to the first functional component can be triggered to be restored. The third-party application cannot trigger, by using the software system, power supplying to the first functional component to be restored, and naturally cannot further control the first functional component to collect privacy information of the user. In addition, the user may control the privacy mode by folding and expanding the electronic device 100 at any time, to implement seamless switching between the privacy mode and a normal service through folding and expanding. This avoids affecting user experience of the normal service.

Figure 8A:
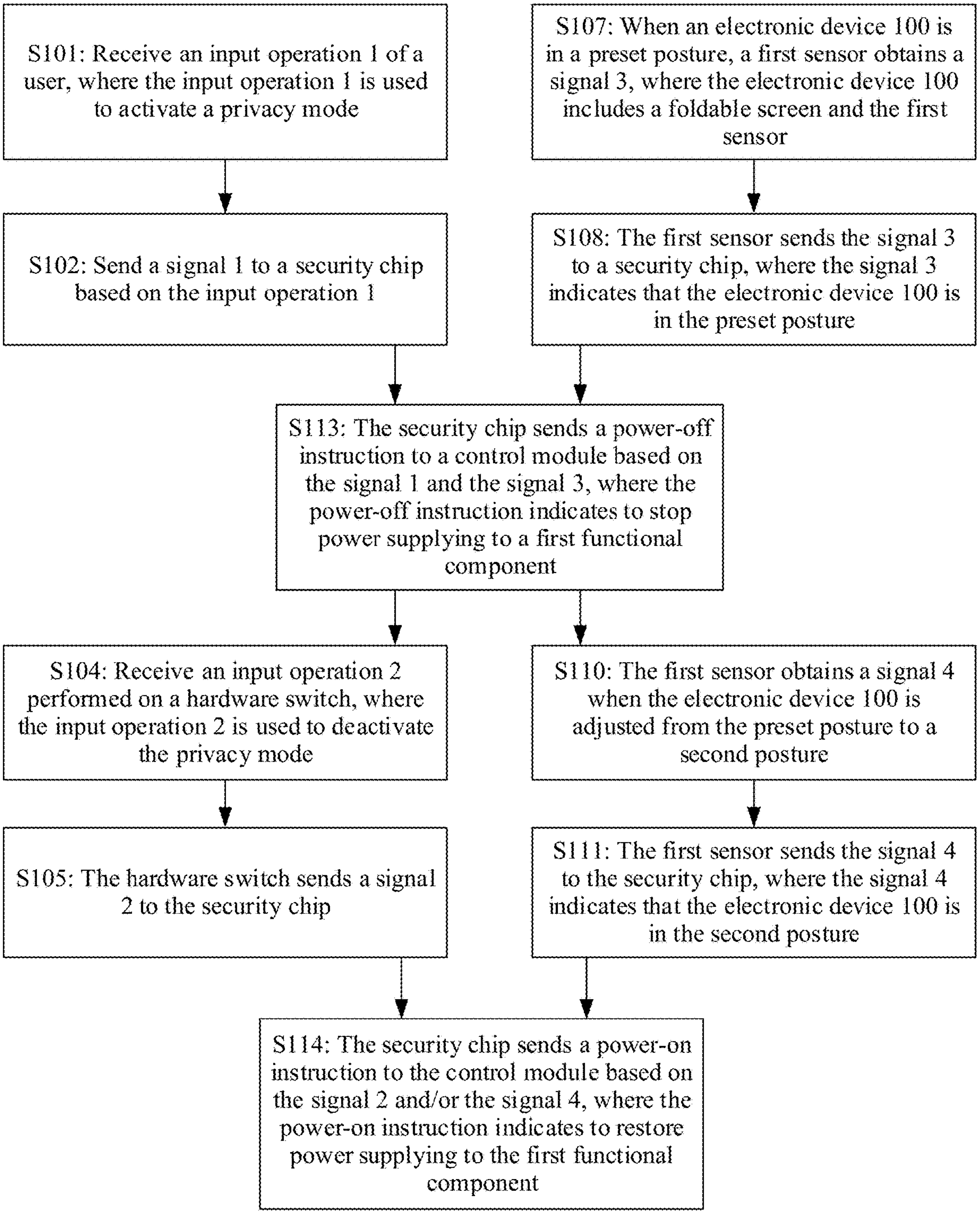
FIG. 8A to FIG. 8C are schematic flowcharts of another component control method according to an embodiment of this application.

FIG. 8A is a schematic flowchart of another component control method according to an embodiment of this application. The method is applied to an electronic device 100 configured with a foldable screen. As shown in FIG. 8A, after performing steps S101 and S102 and steps S107 and S108, the electronic device 100 may further perform S113. After performing steps S104 and S105 and/or steps S110 and S111, the electronic device 100 may further perform S114.

For steps S101 and S102, steps S107 and S108, steps S104 and S105, and steps S110 and S111, refer to the related descriptions in the foregoing embodiments. Details are not described herein again.

S113: The security chip sends a power-off instruction to a control module based on the signal 1 and the signal 3, where the power-off instruction indicates to stop power supplying to a first functional component.

S114: The security chip sends a power-on instruction to the control module based on the signal 2 and/or the signal 4, where the power-on instruction indicates to restore power supplying to the first functional component.

In some embodiments of this application, the electronic device 100 performs steps S101 and S102 and steps S107 and S108, and performs step S113. To be specific, the security chip sends the power-off instruction based on the signal 1 and the signal 3 only after the user folds the electronic device 100 into the preset posture and performs the input operation 1 by using the hardware switch.

Figure 8B:
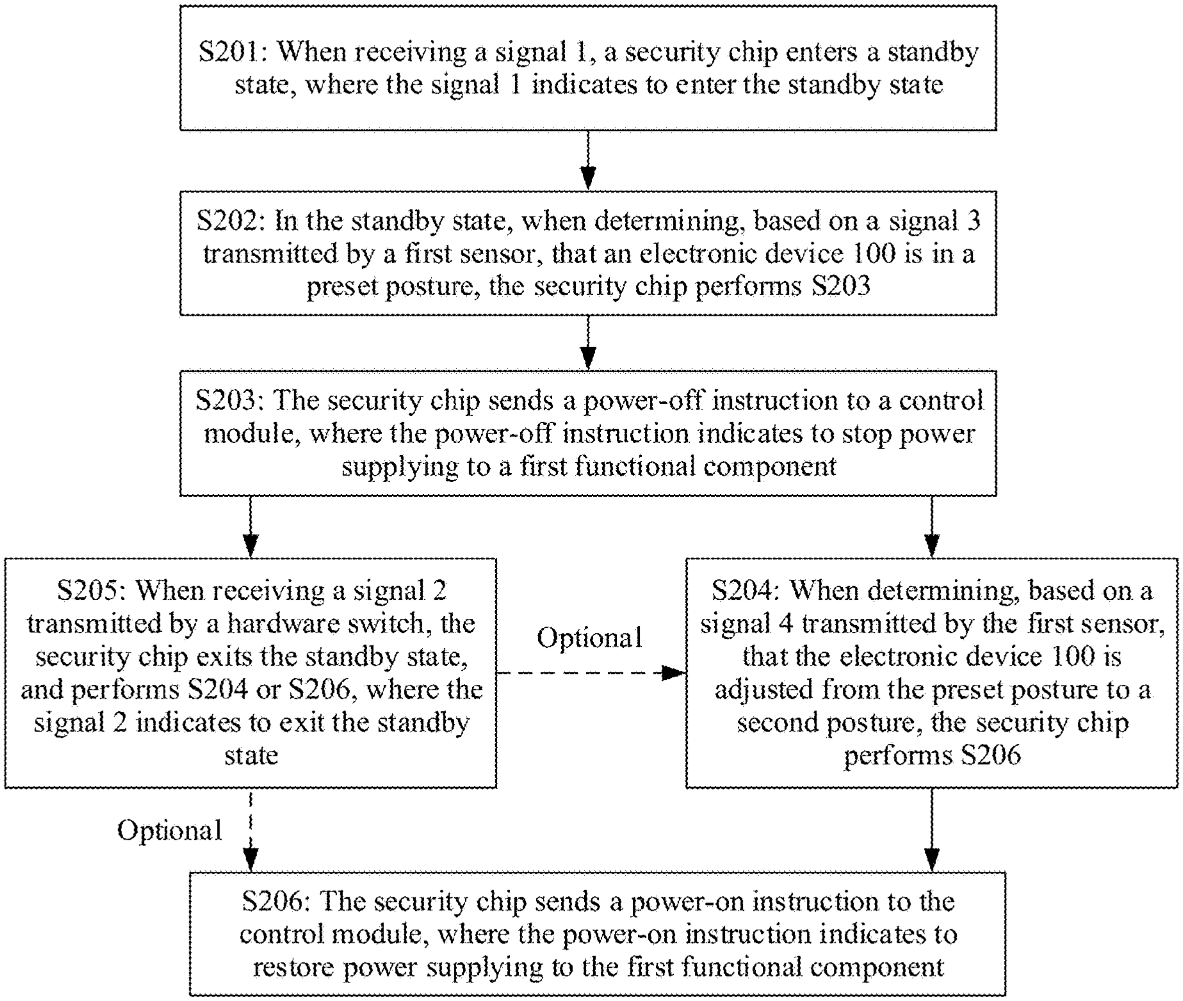

In some implementation solutions of this application, as shown in FIG. 8B, step S113 may specifically include step S201 to step S203, and step S114 may specifically include step S204 to step S206. In a solution provided in FIG. 8B, the user first performs the input operation 1, and then folds the electronic device 100 into the preset posture. To be specific, the electronic device 100 first performs steps S101 and S102 to generate the signal 1, and then performs steps S107 and S108 to generate the signal 3.

In S201, when receiving the signal 1, the security chip enters a standby state, where the signal 1 indicates to enter the standby state.

In some embodiments of this application, the security chip determines, based on a signal transmitted by the hardware switch in real time, whether to enter the standby state. When the security chip receives the signal 1 that is transmitted by the hardware switch and that indicates to enter the standby state, the security chip enters the standby state. It may be understood that, after the electronic device 100 performs S101 and S102, the security chip receives the signal 1, and records that the security chip enters the standby state currently.

In S202, in the standby state, when determining, based on the signal 3 transmitted by the first sensor, that the electronic device 100 is in the preset posture, the security chip performs S203.

In some embodiments of this application, in the standby state, the security chip determines, based on a signal transmitted by the first sensor in real time, whether the electronic device 100 is in the preset posture currently; and if the electronic device 100 is in the preset posture currently, the security chip performs S203, that is, sends a power-off instruction. It may be understood that, after the electronic device 100 performs S107 and S108, the security chip may determine, based on the signal 3 sent by the first sensor, that the electronic device 100 is in the preset posture.

In S203, the security chip sends the power-off instruction to the control module, where the power-off instruction indicates to stop power supplying to the first functional component.

In some embodiments of this application, a difference of the implementation solution shown in FIG. 8B from the solutions described in FIG. 5 and FIG. 7 is that a signal sent by the hardware switch is used to activate or deactivate the standby state, where the standby state may also be referred to as a standby state of the privacy mode or a standby state of powering on/off. For example, when the user performs the input operation 1 by using the hardware switch, the signal 1 generated by the hardware switch is used to activate the standby state of the privacy mode; and when the user performs the input operation 2 by using the hardware switch, the signal 2 generated by the hardware switch is used to deactivate the standby state of the privacy mode.

In some embodiments of this application, when entering the standby state, the electronic device 100 displays prompt information, where the prompt information prompts that the standby state is entered, the privacy mode may be activated by using the preset posture, and the privacy mode may be deactivated by adjusting the preset posture to the second posture. In an implementation, the security chip sends indication information 3 to the application framework layer after receiving the signal 1, and the application framework layer calls, based on the indication information 3, a display module to display the prompt information.

Only in the standby state, the user may change the posture of the electronic device 100, to control activating or deactivating of the privacy mode, that is, control power supplying to the first functional component to be stopped or restored. It may be understood that, when the electronic device 100 does not enter the standby state by performing the input operation 1, a posture of the electronic device 100 does not trigger the first functional component to be disconnected from a power supply. It may be understood that, in some application scenarios, when folding the electronic device 100 into the preset posture, the user does not expect the first functional component to be disconnected from the power supply. Compared with the solution of "triggering the first functional component to be disconnected from the power supply only by using the preset posture" in FIG. 7, in the solution provided in FIG. 8B, the user may determine, based on a requirement of the user, whether to enter the standby state, and further determine whether the preset posture can trigger the first functional component to be disconnected from the power supply.

As shown in FIG. 8B, after S203, the security chip of the electronic device 100 may separately perform S204 and S205.

In S204, when determining, based on the signal 4 transmitted by the first sensor, that the electronic device 100 is adjusted from the preset posture to the second posture, the security chip performs S206.

In some embodiments of this application, after the first functional component is powered off, the security chip determines, based on a signal transmitted by the first sensor, whether the electronic device 100 is adjusted from the preset posture to the second posture; and if the electronic device 100 is adjusted from the preset posture to the second posture, the security chip performs S206, that is, sends a power-on instruction. It may be understood that, after the user adjusts the posture of the electronic device 100 to the second posture, and the electronic device 100 performs S110 and S111, the security chip may determine, based on the signal 4 sent by the first sensor, that the electronic device 100 is adjusted from the preset posture to the second posture.

In S205, when receiving the signal 2 transmitted by the hardware switch, the security chip exits the standby state, and performs S204 or 206, where the signal 2 indicates to exit the standby state.

It may be understood that the user performs the input operation 2 by using the hardware switch, and after the electronic device 100 performs S104 and S105, the security chip may receive the signal 2 sent by the hardware switch.

In an implementation, the security chip stores a preset field. When a value of the preset field is a first value, it indicates that the security chip currently enters the standby state. When a value of the preset field is a second value, it indicates that the security chip currently exits the standby state. After receiving the signal 1, the security chip may update the value of the preset field to the first value. After receiving the signal 2 sent by the hardware switch, the security chip may update the value of the preset field to the second value. For example, the first value is equal to 1, and the second value is equal to 0.

In S206, the security chip sends the power-on instruction to the control module, where the power-on instruction indicates to restore power supplying to the first functional component.

It may be understood that, after the electronic device 100 activates the privacy mode, and the first functional component is disconnected from the power supply, the user adjusts the posture of the electronic device to the second posture, to trigger the electronic device 100 to deactivate the privacy mode and trigger power supplying to the first functional component to be restored. In addition, after the first functional component is disconnected from the power supply, the user performs the input operation 2 by using the hardware switch, to trigger the electronic device 100 to exit the standby state.

In some embodiments of this application, in S205, if the signal 2 is received, S204 is performed. In other words, when the electronic device 100 exits the standby state, if the electronic device 100 is still in the preset posture, and the first functional component is still powered off, the user adjusts the posture of the electronic device 100 to the second posture, to trigger power supplying to the first functional component to be restored. After the standby state is exited and power supplying to the first functional component is restored, the user can no longer control, by changing the posture of the electronic device 100, power supplying to the first functional component to be stopped or restored, that is, control the privacy mode to be activated and deactivated.

In some embodiments of this application, in S205, if the signal 2 is received, S206 is performed. In other words, when the signal 2 triggers the electronic device 100 to exit the standby state, power supplying to the first functional component is further directly triggered to be restored, even if the electronic device 100 is still in the preset posture.

Figure 8C:
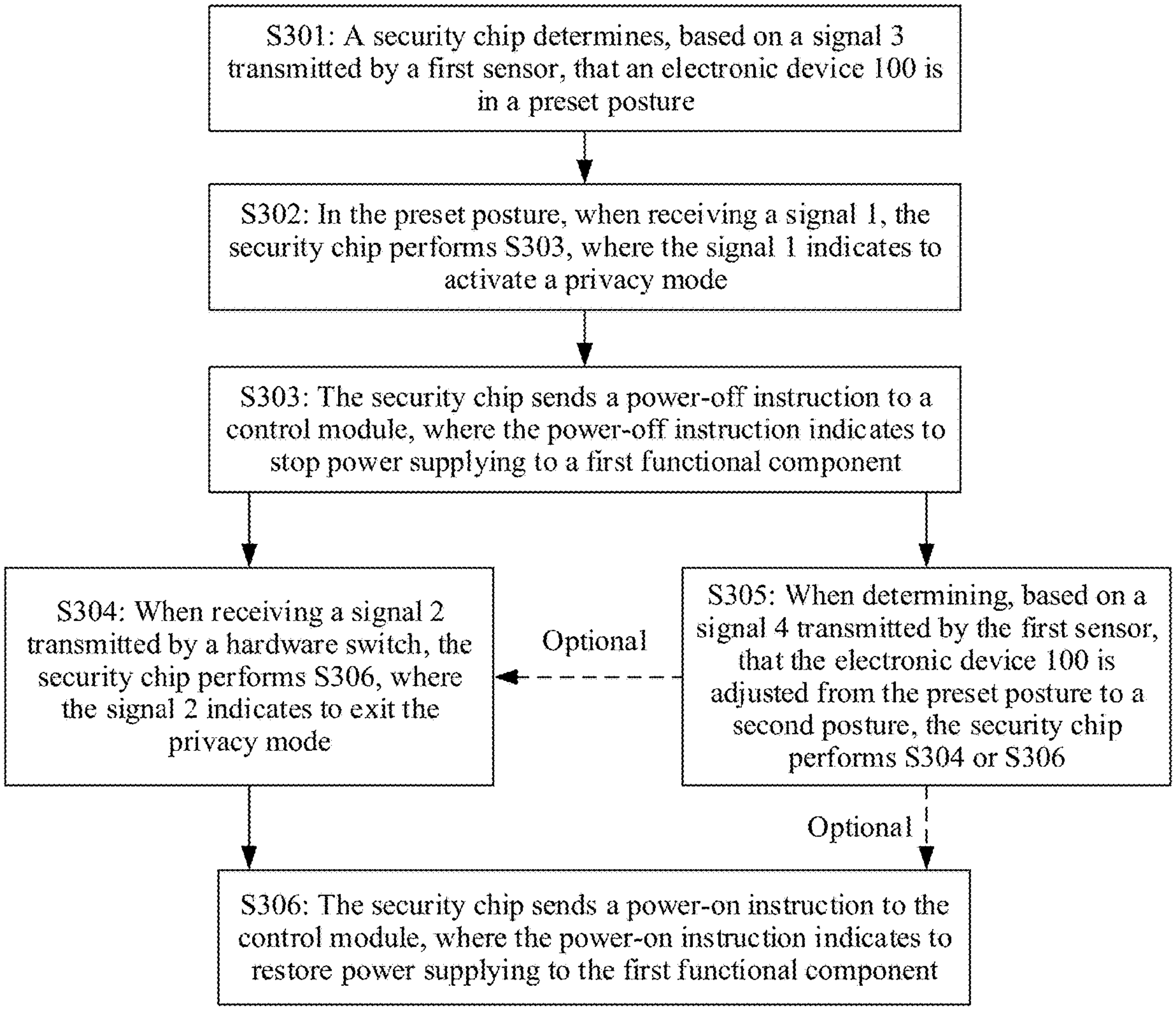

In some other implementation solutions of this application, as shown in FIG. 8C, step S113 may specifically include step S301 to step S303. In a solution provided in FIG. 8C, the user first folds the electronic device 100 into the preset posture, and then performs the input operation 1. To be specific, the electronic device 100 first performs steps S107 and S108 to generate the signal 3, and then performs steps S101 and S102 to generate the signal 1.

In S301, the security chip determines, based on the signal 3 transmitted by the first sensor, that the electronic device 100 is in the preset posture.

In some embodiments of this application, the first sensor transmits a detected signal to the security chip in real time, and the security chip determines, based on the signal transmitted by the first sensor, whether the posture of the electronic device 100 is adjusted to the preset posture; and if the posture of the electronic device 100 is adjusted to the preset posture, the security chip performs S302.

In S302, in the preset posture, when receiving the signal 1, the security chip performs S303, where the signal 1 indicates to activate the privacy mode.

In some embodiments of this application, when determining that the electronic device 100 is in the preset posture, the security chip determines whether the signal 1 transmitted by the hardware switch is received; and if the signal 1 transmitted by the hardware switch is received, the security chip performs S303, that is, sends the power-off instruction.

In S303, the security chip sends the power-off instruction to the control module, where the power-off instruction indicates to stop power supplying to the first functional component.

It may be understood that, in the preset posture, the user can control, by using the hardware switch, activating or deactivating of the privacy mode, that is, control power supplying to the first functional component to be stopped or restored. In a non-preset posture, that the user operates the hardware switch may not trigger the first functional component to be disconnected from the power supply. In some application scenarios, when folding the electronic device 100 into the preset posture, the user does not expect the first functional component to be disconnected from the power supply. Compared with the solution provided in FIG. 7 that "triggering the first functional component to be disconnected from the power supply only by using the preset posture", in the solution provided in FIG. 8C, in the preset posture, the user may determine, based on a requirement of the user, whether to trigger, by using the hardware switch, the first functional component to be disconnected from the power supply.

As shown in FIG. 8C, after S303, the security chip of the electronic device 100 may separately perform S304 and S305.

In S304, when receiving the signal 2 transmitted by the hardware switch, the security chip performs S306, where the signal 2 indicates to exit the privacy mode.

In some embodiments of this application, after the first functional component is disconnected from the power supply, the security chip determines whether the signal 2 transmitted by the hardware switch is received; and if the signal 2 transmitted by the hardware switch is received, the security chip performs S306, that is, sends the power-on instruction.

In S305, when determining, based on the signal 4 transmitted by the first sensor, that the electronic device 100 is adjusted from the preset posture to the second posture, the security chip performs S304 or S306.

In some embodiments of this application, after the first functional component is disconnected from the power supply, the security chip determines, based on a signal transmitted by the first sensor, whether the electronic device 100 is adjusted from the preset posture to the second posture; and if the electronic device 100 is adjusted from the preset posture to the second posture, the security chip performs S306, that is, sends the power-on instruction.

In S306, the security chip sends the power-on instruction to the control module, where the power-on instruction indicates to restore power supplying to the first functional component.

It may be understood that, in the preset posture, the user may control, by using the hardware switch, power supplying to the first functional component to be stopped/restored, that is, activating/deactivating of the privacy mode.

In some embodiments of this application, in S305, if the posture of the electronic device is adjusted to the second posture, S304 is performed. In other words, when the user adjusts the electronic device 100 from the preset posture to the second posture, if the first functional component is still powered off, and the privacy mode is in an on state, the user controls, by using the hardware switch, power supplying to the first functional component to be restored. After the posture of the electronic device 100 is adjusted to the second posture, and power supplying to the first functional component is restored, the user cannot control, by using the hardware switch, power supplying to the first functional component to be stopped or restored.

In some embodiments of this application, in S305, if the posture of the electronic device is adjusted to the second posture, S306 is performed. In other words, the user adjusts the electronic device 100 from the preset posture to the second posture, which further directly triggers power supplying to the first functional component to be restored and the user does not need to operate the hardware switch.

In the solutions provided in FIG. 8A to FIG. 8C, the hardware switch and the first sensor may be used to trigger the security chip to send the power-off instruction, and the hardware switch, the first sensor, the security chip, the control module, the first functional component each transmit a signal through a circuit wire, and the third-party application cannot tamper with or forge the power-off instruction sent by the security chip. In this way, the third-party application cannot activate the privacy mode by using a software system, and the third-party application cannot maliciously control the first functional component to be disconnected from the power supply. In addition, after the first functional component is powered off, the hardware switch and/or the first sensor is used to trigger the security chip to send the power-on instruction, that is, only through signal control between hardware modules, power supplying to the first functional component can be triggered to be restored. In this way, the third-party application cannot trigger, by using the software system, power supplying to the first functional component to be restored, and naturally cannot further control the first functional component to collect privacy information of the user. In the solution provided in FIG. 8B, in the standby state, the user may activate and deactivate the privacy mode by adjusting the posture of the electronic device 100 at any time. In the solution provided in FIG. 8C, in the preset posture, the user may activate and deactivate the privacy mode by using the hardware switch at any time. In the two solutions, quick switching between the privacy mode and the normal service is implemented, and user experience is ensured.

In some embodiments of this application, the electronic device 100 may use the hardware switch or folds the electronic device 100 into the preset posture, to trigger the first functional component to be disconnected from the power supply. In other words, after performing any one of S101 and S102 and S107 and S108, the electronic device 100 performs S113. For example, after the user performs the input operation 1 by using the hardware switch, the security chip sends the power-off instruction based on the signal 1; or after the user folds the electronic device 100 into the preset posture, the security chip sends the power-off instruction based on the signal 3. In this way, on the premise of ensuring information security, more choices are provided for the user, and the user may trigger, in a plurality of manners, the first functional component to be disconnected from the power supply, so that use requirements of different users are met.

In some embodiments of this application, the electronic device 100 may use the hardware switch or adjusts the preset posture to the second posture, to trigger power supplying to the first functional component to be restored. In other words, after performing any one of S104 and S105 and S110 and S111, the electronic device 100 performs S114. In this way, on the premise of ensuring information security, more choices are provided for the user, and the user may trigger, in a plurality of manners, power supplying to the first functional component to be restored, so that use requirements of different users are met.

Figure 9A:
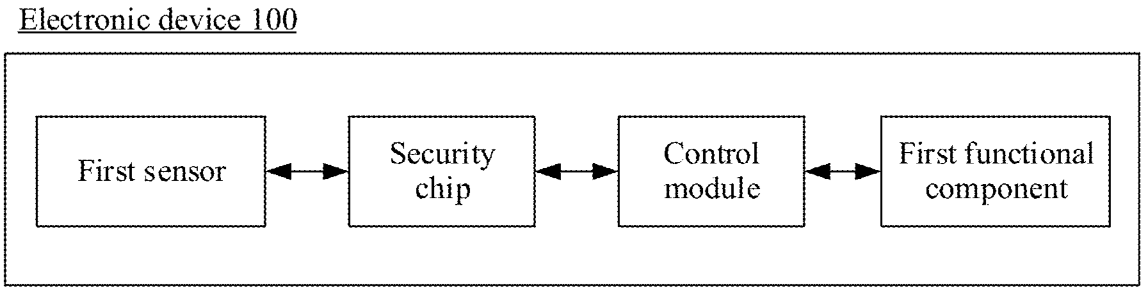
FIG. 9A and FIG. 9B are diagrams of structures of an electronic device according to an embodiment of this application.

FIG. 9A is a diagram of a structure of an electronic device 100 according to this application.

As shown in FIG. 9A, this application provides an electronic device, where the electronic device includes a foldable screen, a first sensor, a security chip, a control module, and a first functional component, and the first sensor, the security chip, and the control module are directly or indirectly connected through a circuit wire.

The first sensor is configured to detect a first operation of a user. The first sensor is further configured to send first sensor data to the security chip based on the first operation, where the first sensor data indicates a posture of the electronic device. The security chip is configured to send a first control instruction to the control module based on the posture indicated by the first sensor data, where the first control instruction indicates to stop power supplying to the first functional component. The control module is configured to control the first functional component to be disconnected from or connected to a power supply.

In some embodiments of this application, the first sensor is further configured to detect a second operation of the user; the first sensor is further configured to send second sensor data to the security chip based on the second operation, where the second sensor data indicates a posture of the electronic device; and the security chip is further configured to send a second control instruction to the control module based on the posture indicated by the second sensor data, where the second control instruction indicates to restore power supplying to the first functional component.

In this embodiment of this application, the first sensor data may include the signal 3, the second sensor data may include the signal 4, the first control instruction may include the power-off instruction, and the second control instruction may include the power-on instruction.

In some embodiments of this application, the first operation includes an operation of adjusting a posture of the electronic device to a first posture, and the first sensor data is used to determine whether the electronic device is in the first posture; and the sending a first control instruction to the control module based on the posture indicated by the first sensor data includes: sending the first control instruction to the control module when it is determined, based on the first sensor data, that the electronic device is in the first posture.

In some embodiments of this application, the second operation includes an operation of adjusting the electronic device from the first posture to a second posture, and the second sensor data is used to determine whether the electronic device is in the second posture; and the sending a second control instruction to the control module based on the posture indicated by the second sensor data includes: sending the second control instruction to the control module when it is determined, based on the second sensor data, that the electronic device is adjusted from the first posture to the second posture.

In some embodiments of this application, the first operation includes activating a privacy mode, and the second operation includes deactivating the privacy mode.

Figure 9B:
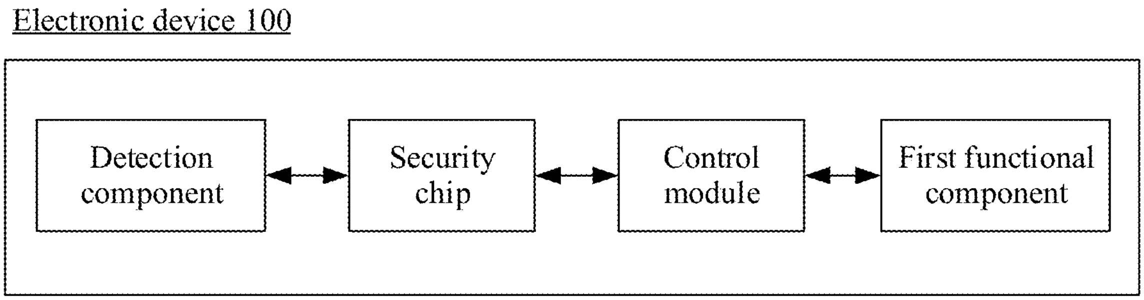

FIG. 9B is a diagram of another structure of an electronic device 100 according to this application.

As shown in FIG. 9B, the electronic device includes a detection component, a security chip, a control module, and a first functional component. The detection component, the security chip, and the control module are directly or indirectly connected through a circuit wire.

The detection component is configured to detect a first operation of a user. The detection component is further configured to send a first control signal to the security chip based on the first operation, where the first control signal indicates to stop power supplying to the first functional component. The security chip is configured to send a first control instruction to the control module based on the first control signal, where the first control instruction indicates to stop power supplying to the first functional component. The control module is configured to control the first functional component to be disconnected from or connected to a power supply.

In some embodiments of this application, the detection component is further configured to detect a second operation of the user; the detection component is further configured to send a second control signal to the security chip based on the second operation, where the second control signal indicates to restore power supplying to the first functional component; and the security chip is further configured to send a second control instruction to the control module based on the second control signal, where the second control instruction indicates to restore power supplying to the first functional component.

In this embodiment of this application, the detection component may include the hardware switch, the first operation may include the input operation 1, the second operation may include the input operation 2, the first control signal may include the signal 1, the second control signal may include the signal 2, the first control instruction may include the power-off instruction, and the second control instruction may be the power-on instruction.

In some embodiments of this application, the first operation includes an operation on the detection component, and the first control signal includes a signal generated by the detection component based on the first operation; and the second operation includes an operation on the detection component, and the second control signal includes a signal generated by the detection component based on the second operation.

In some embodiments of this application, the first operation includes activating a privacy mode, and the second operation includes deactivating the privacy mode.

In some embodiments of this application, the electronic device includes a foldable screen, and the detection component includes the hardware switch and a first sensor. The first operation includes an operation performed on the hardware switch and an operation of adjusting a posture of the electronic device to a first posture, the first control signal includes a first switch signal generated by the hardware switch based on the first operation, and first sensor data collected by the first sensor, and the first sensor data is used to determine whether the electronic device is in the first posture. The second operation includes an operation performed on the hardware switch, and/or an operation of adjusting the electronic device from the first posture to a second posture, the first control signal includes a second switch signal generated by the hardware switch based on the second operation, and/or second sensor data collected by the first sensor, and the second sensor data is used to determine whether the electronic device is in the second posture. The sending a first control signal to the security chip includes: The hardware switch sends the first switch signal to the security chip; and the first sensor sends the first sensor data to the security chip. The sending a first control instruction to the control module based on the first control signal includes: sending the first control instruction to the control module when the first switch signal is received and it is determined, based on the first sensor data, that the electronic device is in the first posture. The sending a second control signal to the security chip includes: The hardware switch sends the second switch signal to the security chip, and/or the first sensor sends the second sensor data to the security chip. The sending a second control instruction to the control module based on the second control signal includes: sending the second control instruction to the control module when the first switch signal is received, and/or it is determined, based on the second control signal, that the electronic device is adjusted from the first posture to the second posture.

The implementations of this application may be randomly combined, to achieve different technical effects.

All or a part of the foregoing embodiments may be implemented by using software, hardware, firmware, or any combination thereof. When software is used to implement embodiments, all or a part of embodiments may be implemented in a form of computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

A person of ordinary skill in the art may understand that all or some of the procedures of the methods in embodiments may be implemented by a computer program instructing related hardware. The program may be stored in the computer-readable storage medium. When the program is run, the processes of the methods in the embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

The invention claimed is:

1. An electronic device comprising:
a foldable screen;
a first sensor;
a security chip;
a control module;
a first functional component; and
one or more processors,
wherein the first sensor, the security chip, and the control module are directly or indirectly connected through a circuit wire, and the control module is configured to control the first functional component to be disconnected from or connected to a power supply;
wherein the first sensor is configured to:
detect a first operation of a user, the first operation activating a privacy mode; and
send first sensor data to the security chip based on the first operation, wherein the first sensor data indicates a posture of the electronic device;
wherein the security chip is configured to:
send a first control instruction to the control module based on the posture indicated by the first sensor data, wherein the first control instruction indicates to stop power supplying to the first functional component,
wherein the security chip has an independent processor and storage unit inside; the security chip is configured to independently generate, encrypt, and decrypt keys; the security chip is distinct from the one or more processors; and the following functions are configured to be provided by the one or more processors: application processing, modem processing, and graphics processing.

2. The electronic device according to claim 1, wherein the first sensor is further configured to:
detect a second operation of the user; and send second sensor data to the security chip based on the second operation, wherein the second sensor data indicates a posture of the electronic device;

wherein the security chip is further configured to:

send a second control instruction to the control module based on the posture indicated by the second sensor data, wherein the second control instruction indicates to the control module to restore power supplying to the first functional component.

3. The electronic device according to claim 1, wherein the first operation comprises an operation of adjusting a posture of the electronic device to a first posture, and the first sensor data is used to determine whether the electronic device is in the first posture, and wherein the security chip is configured to:

send the first control instruction to the control module when it is determined, based on the first sensor data, that the electronic device is in the first posture.

4. The electronic device according to claim 2, wherein the second operation comprises an operation of adjusting the electronic device from the first posture to a second posture, and the second sensor data is used to determine whether the electronic device is in the second posture, wherein the security chip is configured to:

send the a second control instruction to the control module when it is determined, based on the second sensor data, that the electronic device is adjusted from the first posture to the second posture.

5. The electronic device according to claim 2, wherein the second operation comprises deactivating the privacy mode.

6. An electronic device comprising:

a detection component;

a security chip;

a control module;

one or more processors; and a first functional component, wherein the detection component, the security chip, and the control module are directly or indirectly connected through a circuit wire, and the control module is configured to control the first functional component to be disconnected from or connected to a power supply, wherein the detection component is configured to:

detect a first operation of a user, the first operation activating a privacy mode; and send a first control signal to the security chip based on the first operation, wherein the first control signal indicates to stop power supplying to the first functional component;

wherein the security chip has an independent processor and storage unit inside and is configured to:

send a first control instruction to the control module based on the first control signal, wherein the first control instruction indicates to stop power supplying to the first functional component; and the security chip is configured to independently generate, encrypt, and decrypt keys; the security chip is distinct from the one or more processors; and the following functions are configured to be provided by the one or more processors: application processing, modem processing, and graphics processing.

7. The electronic device according to claim 6, wherein the detection component is further configured to:

detect a second operation of the user; and send a second control signal to the security chip based on the second operation, wherein the second control signal indicates to restore power supplying to the first functional component, and wherein the security chip is further configured to:

send a second control instruction to the control module based on the second control signal, wherein the second control instruction indicates to restore power supplying to the first functional component.

8. The electronic device according to claim 7, wherein the first operation comprises an operation on the detection component, and the first control signal comprises a signal generated by the detection component based on the first operation, the second operation comprises an operation on the detection component, and the second control signal comprises a signal generated by the detection component based on the second operation.

9. The electronic device according to claim 7, wherein the second operation comprises deactivating the privacy mode.

10. A method performed by an electronic device having a foldable screen, the method comprising:

detecting, by a first sensor of the electronic device, a first operation of a user, the first operation activating a privacy mode;

sending, by the first sensor, first sensor data to a security chip of the electronic device based on the first operation, wherein the first sensor data indicates a posture of the electronic device; and sending, by the security chip, a first control instruction to a control module of the electronic device based on the posture indicated by the first sensor data, wherein the control module is configured to control the first functional component to be disconnected from or connected to a power supply, and the first control instruction indicates to stop supplying power to the first functional component, wherein the security chip has an independent processor and storage unit inside; the security chip is configured to independently generate, encrypt, and decrypt keys; the security chip is distinct from one or more processors of the electronic device; and the following functions are provided by the one or more processors: application processing, modem processing, and graphics processing.

11. The method according to claim 10, further comprising:

detecting, by the first sensor, a second operation of the user;

sending, by the first sensor, second sensor data to the security chip based on the second operation, wherein the second sensor data indicates a posture of the electronic device; and sending, by the security chip, a second control instruction to the control module based on the posture indicated by the second sensor data, wherein the second control instruction indicates to restore supplying power to the first functional component.

12. The method according to claim 10, wherein the first operation comprises an operation of adjusting a posture of the electronic device to a first posture, and the first sensor data is used to determine whether the electronic device is in the first posture, and wherein the step of sending the first control instruction sends the first control instruction to the control module when it is determined, based on the first sensor data, that the electronic device is in the first posture.

13. The method according to claim 11, wherein the second operation comprises an operation of adjusting the electronic device from the first posture to a second posture, and the second sensor data is used to determine whether the electronic device is in the second posture, and wherein the step of sending a second control instruction sends the second control instruction to the control module when it is determined, based on the second sensor data, that the electronic device is adjusted from the first posture to the second posture.

14. The method according to claim 11, wherein the second operation comprises deactivating the privacy mode.

* * * * *